(12) United States Patent
Li et al.

(10) Patent No.: US 12,267,878 B2
(45) Date of Patent: Apr. 1, 2025

(54) ORTHOGONAL FREQUENCY DIVISION MULTIPLE ACCESS (OFDMA) HYBRID TRANSMISSION METHOD AND APPARATUS

(71) Applicant: Huawei Technologies Co., Ltd., Shenzhen (CN)

(72) Inventors: Yunbo Li, Shenzhen (CN); Jian Yu, Shenzhen (CN); Ming Gan, Shenzhen (CN); Mao Yang, Xi'an (CN); Bo Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 479 days.

(21) Appl. No.: 17/689,677

(22) Filed: Mar. 8, 2022

(65) Prior Publication Data
US 2022/0201769 A1    Jun. 23, 2022

Related U.S. Application Data

(63) Continuation of application No. PCT/CN2020/114093, filed on Sep. 8, 2020.

(30) Foreign Application Priority Data

Sep. 9, 2019 (CN) .......................... 201910848781.2

(51) Int. Cl.
*H04W 74/0833* (2024.01)
*H04W 28/26* (2009.01)
(Continued)

(52) U.S. Cl.
CPC ....... *H04W 74/0841* (2013.01); *H04W 28/26* (2013.01); *H04W 72/0453* (2013.01); *H04W 74/0866* (2013.01)

(58) Field of Classification Search
CPC ............. H04W 74/0841; H04W 28/26; H04W 72/0453; H04W 74/0866; H04W 72/23;
(Continued)

(56) References Cited

U.S. PATENT DOCUMENTS

2017/0237532 A1    8/2017 Li et al.
2019/0124556 A1    4/2019 Verma et al.
(Continued)

FOREIGN PATENT DOCUMENTS

CN    107210989 A    9/2017
CN    107431676 A    12/2017
(Continued)

OTHER PUBLICATIONS

WO-2018155160 merged (Year: 2018).*
(Continued)

*Primary Examiner* — Yu-Wen Chang
(74) *Attorney, Agent, or Firm* — Leydig, Voit & Mayer, Ltd.

(57) ABSTRACT

This application relates to the field of wireless communication, and in particular, to an orthogonal frequency division multiple access (OFDMA) hybrid transmission method and apparatus. The method includes: An access point may send a trigger frame, to schedule stations supporting different standards to perform OFDMA uplink transmission, where the stations supporting different standards support different bandwidth sizes. The stations receiving the trigger frame send a trigger-based physical layer protocol data unit (TB PPDU) to the access point, where the TB PPDU includes uplink data of the stations supporting different standards, and the stations of different standards may send the uplink data by using RUs located in bandwidths respectively supported by the stations. Therefore, a channel can be fully utilized to improve frequency domain resource utilization.

19 Claims, 10 Drawing Sheets

(51) Int. Cl.
*H04W 72/0453* (2023.01)
*H04W 74/08* (2009.01)

(58) Field of Classification Search
CPC .......... H04W 74/006; H04W 74/0833; H04W 74/04; H04W 72/0446; H04W 72/20; H04L 5/001; H04L 5/0007; H04L 5/0055
See application file for complete search history.

(56) References Cited

U.S. PATENT DOCUMENTS

| | | | |
|---|---|---|---|
| 2019/0238301 A1 | 8/2019 | Verma et al. | |
| 2020/0045656 A1* | 2/2020 | Verma | H04L 27/2602 |
| 2020/0359248 A1* | 11/2020 | Sadeghi | H04W 74/0808 |
| 2020/0404683 A1* | 12/2020 | Houghton | H04W 72/52 |
| 2021/0329721 A1* | 10/2021 | Kim | H04W 76/15 |
| 2022/0217797 A1* | 7/2022 | Kim | H04W 76/15 |
| 2022/0239451 A1* | 7/2022 | Park | H04W 72/0453 |
| 2022/0255681 A1* | 8/2022 | Huang | H04L 1/1861 |

FOREIGN PATENT DOCUMENTS

| | | | | |
|---|---|---|---|---|
| CN | 108400858 A | 8/2018 | | |
| CN | 109076614 A | 12/2018 | | |
| WO | WO-2018155160 A1 * | 8/2018 | ............. | G06T 11/40 |

OTHER PUBLICATIONS

"IEEE Standard for Information technology-Telecommunications and information exchange between systems Local and metropolitan area networks-Specific requirements, Part 11: Wireless LAN Medium Access Control (MAC) and Physical Layer (PHY) Specifications, Amendment 4: Enhancements for Very High Throughput for Operation in Bands below 6 Ghz," IEEE Std 802.11ac-2013, Total 425 pages, Institute of Electrical and Electronics Engineers, New York, New York (Approved Dec. 11, 2013).

"Draft Standard for Information technology-Telecommunications and information exchange between systems Local and metropolitan area networks-Specific requirements-Part 11: Wireless LAN Medium Access Control(MAC) and Physical Layer (PHY) Specifications, Amendment 6: Enhancements for High Efficiency WLAN," IEEE P802.11ax/D2.2, Total 620 pages, Institute of Electrical and Electronics Engineers, New York, New York (Feb. 2018).

* cited by examiner

ORTHOGONAL FREQUENCY DIVISION MULTIPLE ACCESS (OFDMA) HYBRID TRANSMISSION METHOD AND APPARATUS

CROSS-REFERENCE TO RELATED APPLICATIONS

This application is a continuation of International Application No. PCT/CN2020/114093, filed on Sep. 8, 2020, which claims priority to Chinese Patent Application No. 201910848781.2, filed on Sep. 9, 2019. The disclosures of the aforementioned applications are hereby incorporated by reference in their entireties.

TECHNICAL FIELD

This application relates to the field of wireless communication, and in particular, to an orthogonal frequency division multiple access (OFDMA) hybrid transmission method and apparatus in a wireless communications system.

BACKGROUND

As a wireless local access network (Wireless Local Access Network, WLAN for short) communication standard evolves and develops from 802.11a, 802.11g, 802.11n, 802.11ac, 802.11ax, and the like, a transmission bandwidth and a number of space-time streams that are permitted in the standard gradually change. A transmission bandwidth permitted in the standard 802.11a or 802.11g is 20 MHz, a transmission bandwidth permitted in the standard 802.11n is 20 MHz or 40 MHz, and a transmission bandwidth permitted in current 802.11ax is 20 MHz, 40 MHz, 80 MHz, or 160 MHz. In a WLAN system, a higher bandwidth is used to obtain a higher transmission rate. A next-generation standard IEEE 802.11be is referred to as extremely high throughput (EHT), and uses a significant increase in a peak throughput as its most important technical goal and expands the supported bandwidth from 160 MHz of IEEE 802.11ax to at least 320 MHz, thereby expecting to further increase a transmission rate.

The 802.11ax standard introduces an orthogonal frequency division multiple access mechanism. A channel supported by 802.11ax may be divided into one or more resource units (RUS) to be allocated to one or more stations for data transmission, thereby implementing OFDMA transmission. With evolution of standards, in a basic service set of a WLAN, an access point (AP) may be associated with a station STA) supporting 802.11be and a station supporting 802.11ax. When the access point obtains one channel, and a bandwidth of the channel is greater than a bandwidth supported by the 802.11ax station, if the 802.11ax OFDMA transmission mechanism is used, the access point cannot schedule the station supporting 802.11ax and the station supporting 802.11be to perform orthogonal frequency division multiple access (OFDMA) uplink data transmission on the channel, or cannot send downlink data to the station supporting 802.11ax and the station supporting 802.11be on the channel by using the OFDMA mechanism. Consequently, frequency domain resources may be wasted.

SUMMARY

To resolve the foregoing problem, this application provides an orthogonal frequency division multiple access (OFDMA) uplink hybrid transmission method and apparatus, applied to a wireless communications system, to fully utilize a channel, thereby improving spectral efficiency.

According to a first aspect, an embodiment of this application provides an orthogonal frequency division multiple access (OFDMA) uplink hybrid transmission method, including: An access point (AP) sends a trigger frame, where the trigger frame is used to trigger a first STA supporting a first standard to send first uplink data on a first resource unit (RU), and is further used to trigger a second STA supporting a second STA to send second uplink data on a second RU; and the AP receives a trigger-based physical layer protocol data unit (TB PPDU), where a bandwidth of the TB PPDU is a second bandwidth, and the TB PPDU includes the first uplink data sent by the first STA in response to the trigger frame and the second uplink data sent by the second STA in response to the trigger frame, where the first STA supports a first bandwidth, the second STA supports the second bandwidth, the second bandwidth is greater than the first bandwidth, the first RU is located in the first bandwidth, and the second RU is located in the second bandwidth. By using the solution of this application, the AP can communicate with the second STA by fully utilizing a bandwidth that is not supported by the first STA, and no guard band needs to be specified. Therefore, a channel can be fully utilized to improve frequency domain resource utilization.

According to a second aspect, an embodiment of this application provides an orthogonal frequency division multiple access (OFDMA) uplink hybrid transmission method, applied to a second station supporting a second standard, and including: The second station receives a trigger frame, where the trigger frame is used to trigger a first STA to send first uplink data on a first resource unit (RU), and is used to trigger the second STA to send second uplink data on a second RU; and the second station sends a trigger-based physical layer protocol data unit (TB PPDU) based on the trigger frame, where a bandwidth of the TB PPDU is a second bandwidth, and the TB PPDU includes the first uplink data sent by the first STA in response to the trigger frame and the second uplink data sent by the second STA in response to the trigger frame, where the first STA supports a first bandwidth, the second STA supports the second bandwidth, the second bandwidth is greater than the first bandwidth, the first RU is located in the first bandwidth, and the second RU is located in the second bandwidth. By using this solution, the second STA can communicate with an AP by fully utilizing a part of bandwidth that cannot be supported by the first STA, and a guard interval is not required, so that a channel can be fully utilized to improve spectral efficiency.

According to a third aspect, an apparatus is provided, where the apparatus is an AP or a chip in the AP, and includes a sending unit, a receiving unit, and a processing unit. The processing unit is configured to generate a trigger frame. The sending unit is configured to send the trigger frame, where the trigger frame is used to trigger a first STA supporting a first standard to send first uplink data on a first RU and a second STA supporting a second standard to send second uplink data on a second RU. The receiving unit is configured to receive a trigger-based physical layer protocol data unit (TB PPDU), where a bandwidth of the TB PPDU is a second bandwidth, and the TB PPDU includes the first uplink data sent by the first STA in response to the trigger frame and the second uplink data sent by the second STA in response to the trigger frame, where the first STA supports a first bandwidth, the second STA supports the second bandwidth, the second bandwidth is greater than the first bandwidth, the first RU is located in the first bandwidth, and the second RU is located in the second bandwidth. The AP can communicate with the second STA by fully utilizing a bandwidth that is not supported by the first STA, and no guard band needs to be specified. Therefore, a channel can be fully utilized to improve frequency domain resource utilization.

According to a fourth aspect, an apparatus is provided, where the apparatus is a second STA or a chip in the second STA, and includes a sending unit, a receiving unit, and a processing unit. The receiving unit is configured to receive a trigger frame, where the trigger frame is used to trigger a first STA supporting a first standard to send first uplink data on a first RU and the second STA supporting a second standard to send second uplink data on a second RU. The processing unit is configured to control, based on the trigger frame, the sending unit to send a trigger-based physical layer protocol data unit (TB PPDU), where a bandwidth of the TB PPDU is a second bandwidth, and the TB PPDU includes the first uplink data sent by the first STA in response to the trigger frame and the second uplink data sent by the second STA in response to the trigger frame, where the first STA supports a first bandwidth, the second STA supports the second bandwidth, the second bandwidth is greater than the first bandwidth, the first RU is located in the first bandwidth, and the second RU is located in the second bandwidth. The second STA can communicate with an AP by fully utilizing a part of bandwidth that cannot be supported by the first STA, and a guard interval is not required, so that a channel can be fully utilized to improve spectral efficiency.

In an example in any aspect of the first aspect to the fourth aspect, the trigger frame includes a common information field, the common information field includes an uplink bandwidth field and a first reserved bit, and the uplink bandwidth field and the first reserved bit are jointly used for determining, by the second STA, the second bandwidth. Optionally, the first reserved bit includes 1 bit, and when a value of the 1 bit is 1, the uplink bandwidth field is used for determining, by the second station, the second bandwidth. Based on this solution, a frame format of the trigger frame does not need to be modified, and other signaling information does not need to be added. This not only is compatible with the first STA, but also supports the second STA in accurately obtaining the second bandwidth, and further reduces signaling overheads.

In an example in any aspect of the first aspect to the fourth aspect, the trigger frame includes a second user information field, the second user information field includes a second resource unit allocation field, a second AID field, and a second reserved bit, the second AID field includes an identifier of the second STA, and the second resource unit allocation field and the second reserved bit are jointly used for indicating the second RU. Optionally, the second reserved bit is used for indicating that the second RU is located on a primary 160 MHz channel or a secondary 160 MHz channel; and the second resource unit allocation field is used for indicating a size and a location of the second RU on the 160 MHz channel indicated by the second reserved bit. Based on this solution, a frame format of the trigger frame does not need to be modified, and other signaling information does not need to be added. This not only is compatible with the first STA, but also supports the second STA in accurately obtaining the size and the location of the second RU, and further reduces signaling overheads.

In an example in any aspect of the first aspect to the fourth aspect, when a value of the second AID field is a second AID value, a plurality of consecutive RUs starting from the second RU are indicated as available random access resource units of the second STA. Optionally, the second AID value is a non-0 another special AID value, for example, 2044 or 2047. Based on this solution, the second STA can accurately determine RA-RUs that perform UORA.

In an example in any aspect of the first aspect to the fourth aspect, the trigger frame includes a first trigger frame and a second trigger frame, the first trigger frame is carried on a third RU, and the second trigger frame is carried on a fourth RU of the MU PPDU; the MU PPDU includes a signaling B field, where the signaling B field includes: a fourth user information field corresponding to the fourth RU; and a value of a fourth AID field in the fourth user information field is a non-0 special AID value, used for indicating that the second trigger frame is broadcast information. For example, the special AID value is any value in 2008 to 2044, for example, 2044 or 2008. Based on this solution, the first STA can be prevented from parsing two RUs, so that the second STA can correctly parse the broadcast information on the fourth RU.

In an example in any aspect of the first aspect to the fourth aspect, the TB PPDU further includes a first physical layer preamble sent by the first STA, and a second physical layer preamble sent by the second STA; and an OFDM symbol in the first physical layer preamble is aligned with an OFDM symbol in the second physical layer preamble, or the first physical layer preamble is the same as the second physical layer preamble. The manner in which OFDM symbol alignment is used or transmitted physical layer preambles are the same can be better compatible with an 802.11ax station, to improve reliability.

According to a fifth aspect, an OFDMA downlink hybrid transmission method is provided, including: An access point (AP) sends a physical layer protocol data unit (PPDU), where the PPDU includes first downlink data of a first STA supporting a first standard and second downlink data of a second STA supporting a second standard, where a bandwidth of the PPDU is a second bandwidth, the second STA supports the second bandwidth, the first STA supports a first bandwidth, and the second bandwidth is greater than the first bandwidth; and the first downlink data is carried on a first RU included in the first bandwidth, and the second downlink data is carried on a second RU included in the second bandwidth. The AP can communicate with the second STA by fully utilizing a bandwidth that is not supported by the first STA, and no guard band needs to be specified. Therefore, a channel can be fully utilized to improve frequency domain resource utilization.

According to a sixth aspect, an OFDMA downlink hybrid transmission method is provided, including: A second station receives a physical layer protocol data unit (PPDU), where the PPDU includes first downlink data of a first STA supporting a first standard and second downlink data of the second STA supporting a second standard, where a bandwidth of the PPDU is a second bandwidth, the second STA supports the second bandwidth, the first STA supports a first bandwidth, and the second bandwidth is greater than the first bandwidth; and the second station parses the PPDU to obtain the second downlink data, where the first downlink data is carried on a first RU included in the first bandwidth, and the second downlink data is carried on a second RU included in the second bandwidth. By using this solution, the second STA can communicate with an AP by fully utilizing a part of bandwidth that cannot be supported by the first STA, and a guard interval is not required, so that a channel can be fully utilized to improve spectral efficiency.

In an example of the fifth aspect or the sixth aspect, the PPDU further includes a first resource indication for indicating a third RU; the third RU is used by the first STA to send first acknowledgement information in response to the first downlink data; the PPDU further includes a second resource indication for indicating a fourth RU; and the fourth RU is used by the second STA to send second acknowledgement information in response to the second downlink data. The second downlink data is a second aggregated media access control protocol data unit, the second resource indication is carried in a TRS control field in the second A-MPDU, and the second resource indication includes a resource unit allocation field and a reserved bit. Optionally, the reserved bit is used for indicating that the fourth RU is located on a primary 160 MHz channel or a secondary 160 MHz channel; and the resource unit allocation field is used for indicating a size and a location of the fourth RU on the 160 MHz channel indicated by the reserved bit.

According to a seventh aspect, an embodiment of this application provides a communications apparatus. The apparatus is specifically an access point (AP). The access point has a function of implementing behavior of the access point in the foregoing method designs. The function may be implemented by hardware, or may be implemented by hardware executing corresponding software. The hardware or the software includes one or more modules corresponding to the foregoing function.

In a possible design, the access point (AP) includes a processor and a transceiver. The processor is configured to support the access point in performing the corresponding functions in the foregoing methods. The transceiver is configured to: support the access point in communicating with a first STA and a second STA, and send the information, the data packet, or the instructions in the foregoing methods to the first STA and the second STA. The access point may further include a memory. The memory is configured to couple to the processor and store program instructions and data that are necessary for the access point.

According to an eighth aspect, an embodiment of this application provides a station. The station has a function of implementing behavior of the second STA in the foregoing method designs. The function may be implemented by hardware, or may be implemented by hardware executing corresponding software. The hardware or the software includes one or more modules corresponding to the foregoing function. The module may be software and/or hardware.

In a possible design, a structure of the station includes a transceiver and a processor, where the transceiver is configured to: support communication between a second STA and an access point (AP), receive a trigger frame sent by the AP, receive acknowledgement information sent by the AP, and the like. The processor obtains a size and a location of an RU based on the trigger frame. The station may further include a memory. The memory is configured to be coupled to the processor and store program instructions and data that are necessary for the station.

According to another aspect, an embodiment of this application provides a wireless communications system. The system includes the access point in the foregoing aspect, a first STA, and a second STA. The first STA and the second STA support different standards.

According to another aspect, an embodiment of this application provides a chip or a chip system, including an input/output interface and a processing circuit, where the input/output interface is used for information or data exchange, and the processing circuit is configured to run instructions, so that an apparatus mounted in the chip or the chip system performs the method in any one of the foregoing aspects.

According to another aspect, this application provides a computer-readable storage medium. The computer-readable storage medium stores instructions, and the instructions may be executed by one or more processors on a processing circuit. When the computer-readable storage medium is run on a computer, the computer is enabled to perform the method according to the aspect.

According to another aspect, this application provides a computer program product that includes instructions, and when the product is run on a computer, the computer is enabled to perform the method in the foregoing aspect.

According to another aspect, this application provides a chip system, where the chip system includes a processor, configured to support an apparatus mounted in the chip system in implementing the method in any one of the foregoing aspects, for example, generating or processing data and/or information in the foregoing method. In a possible design, the chip system further includes a memory, and the memory is configured to store program instructions and data that are necessary for a data sending device. The chip system may include a chip, or may include a chip and another discrete component.

BRIEF DESCRIPTION OF DRAWINGS

To describe embodiments of the present application more clearly, the following briefly describes the accompanying drawings for describing the embodiments. It is clear that a person of ordinary skill in the art can further obtain other drawings based on these accompanying drawings without creative efforts.

DESCRIPTION OF EMBODIMENTS

A scenario described in embodiments of this application is intended to describe the technical solutions in the embodiments of this application more clearly, and does not constitute a limitation on the technical solutions provided in the embodiments of this application.

Figure 1:
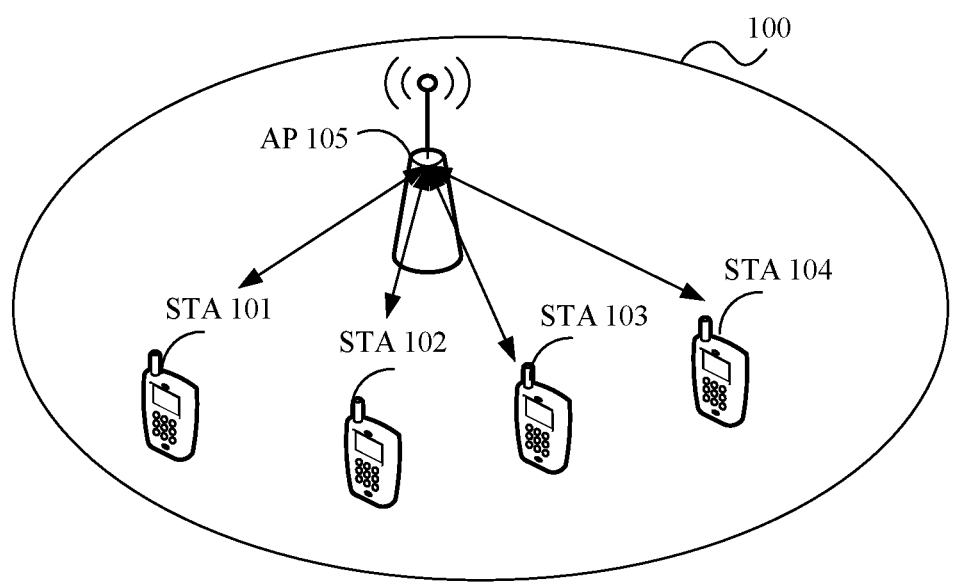
FIG. 1 is a schematic diagram of a possible application scenario according to an embodiment of this application.

FIG. 1 shows a wireless local access network (WLAN) communications system 100. The communications system 100 includes an access point (AP) 105, one or more first stations (for example, a STA 101 and a STA 102), and one or more second stations (a STA 103 and a STA 104), where the first STA and the second STA have different capability sets. In an example, the one or more first STAs 101 may have a first capability set, and the one or more second STAs 102 may have a second capability set. The one or more first stations (STAs) 101 that have the first capability set may comply with a first standard, the one or more second stations (STAs) 102 having the second capability set may comply with a second standard. In one aspect, the second STA having the second capability set may be more advanced than the first STA having the first capability set, and the first STA having the first capability set may be a legacy device. In an example, the second standard may be backward compatible with the first standard. For example, the second standard may be the 802.11be standard, or a next-generation wireless communication standard protocol or a further next-generation wireless communication standard protocol of 802.11be, and the first standard may be a wireless communication standard protocol such as 802.11ax. In another aspect, the first STA having the first capability set may support the first standard, and the second STA 103 having the second capability set may not only support the first standard, but also support the second standard, but work in a mode of the second standard, where the second standard may be backward compatible with the first standard.

The access point (for example, the AP 105) is an apparatus that has a wireless communication function, has a function of communicating with the one or more first STAs 101, and further has a function of communicating with the one or more second STAs 102. In an implementation, the AP 105 not only supports the first standard, but also supports the second standard. The access point (AP) 105 may be an AP that performs data transmission by using the 802.11 protocol. In an example, a plurality of stations (STAs) are connected to the AP over a wireless link that complies with Wi-Fi, to obtain general connectivity to the internet or to another wide area network. In some implementations, a STA may also be used as an AP. It may be understood that, a quantity of APs and a quantity of STAs in the WLAN communications system 100 are merely examples, and do not constitute a limitation on the embodiments of this application.

A person skilled in the art may understand that, in the WLAN communications system, the first STA and the second STA in this application may alternatively be various user terminals, user apparatuses, access apparatuses, subscriber stations, subscriber units, mobile stations, user agents, or user equipments that have a wireless communication function, or have other names. The user terminal may include various handheld devices, vehicle-mounted devices, wearable devices, or computing devices, another processing device connected to a wireless modem, various forms of user equipment (User Equipment, UE for short), a mobile station (Mobile station, MS for short), a terminal (terminal), a terminal device (Terminal Equipment), a portable communications device, a handheld device, a portable computing device, an entertainment device, a game device or system, a global positioning system device, or any other suitable device configured to perform network communication by using a wireless medium, and the like that has a wireless communication function. Herein, for ease of description, the device mentioned above is collectively referred to as a station or STA.

The access point (AP) in this application is an apparatus that is deployed in a wireless communications network and that provides a wireless communication function for a station, and may be used as a hub of a WLAN. The access point (AP) may alternatively be a base station, a router, a gateway, a repeater, a communications server, a switch, a bridge, or the like. The base station may include various forms of macro base stations, micro base stations, relay nodes, and the like. For ease of description, the apparatus that provides the wireless communication function and a service for the station (STA) is collectively referred to as an access point or AP.

Figure 2:
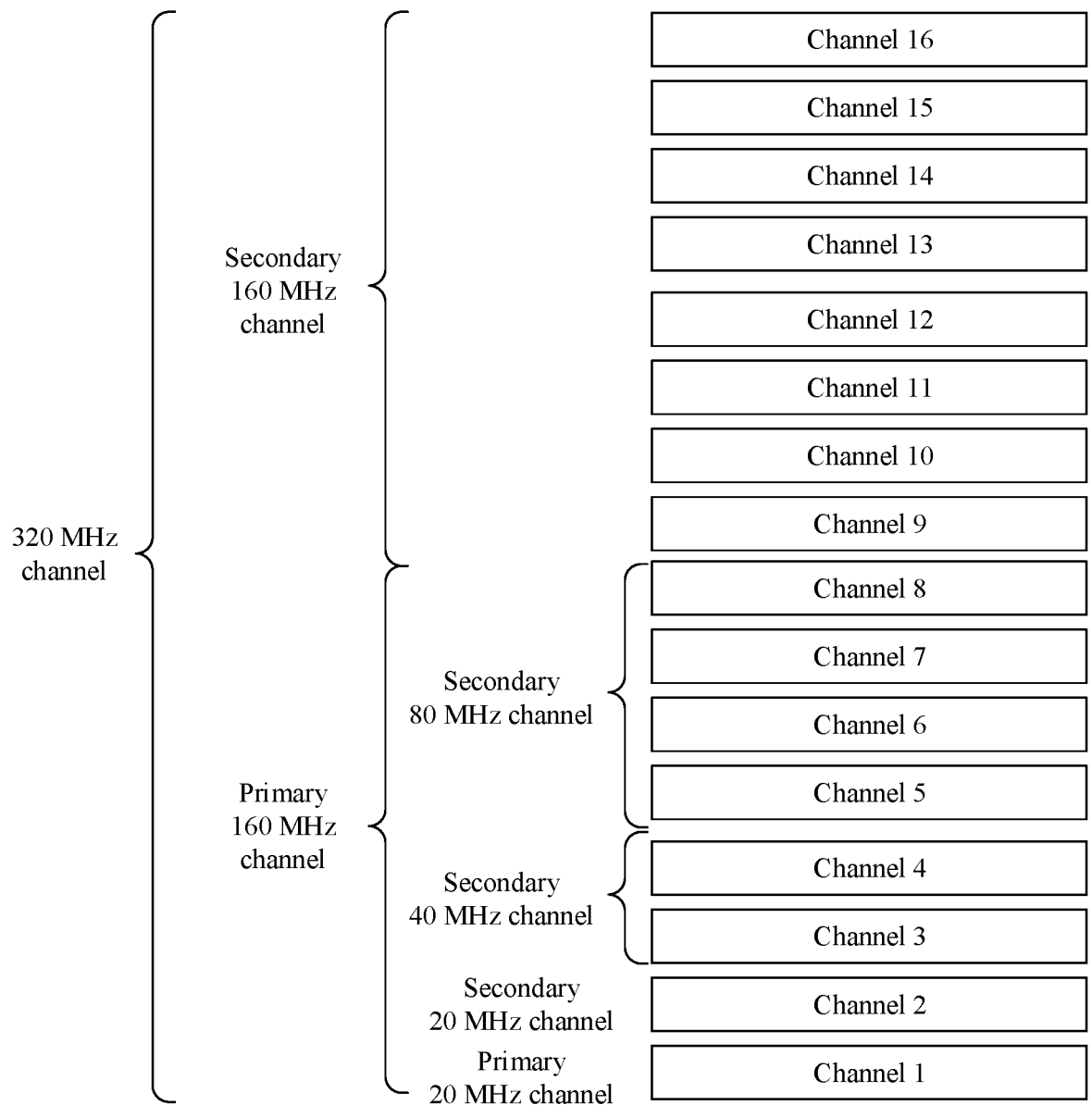
FIG. 2 is a schematic diagram of channel division in an 802.11 system.

In the WLAN, channels are usually classified into a primary channel and a secondary channel, and the secondary channel may include one or more sub-channels. In an example, if classification is performed by using 20 MHz as a basic bandwidth unit, when a channel bandwidth is 20 MHz, there is only one primary channel with a bandwidth of 20 MHz; or when a channel bandwidth is greater than 20 MHz, one channel with a bandwidth of 20 MHz is a primary channel, and one or more other 20 MHz channels are secondary channels. For example, as shown in FIG. 2, a channel bandwidth is 320 MHz, and the 320 MHz channel includes a 160 MHz primary channel and a 160 MHz secondary channel. The 320 Hz channel is sequentially numbered as a channel 1 to a channel 16, and each sequence number represents a 20 MHz channel. The channel 1 represents a 20 MHz primary channel (primary 20 MHz channel, P20 for short). The channel 2 represents a 20 MHz secondary channel (secondary 20 MHz channel, S20 for short). A 40 MHz secondary channel (secondary 40 MHz channel, S40) for short) includes two sub-channels whose bandwidths each are 20 MHz: the channel 3 and the channel 4. An 80 MHz secondary channel (secondary 80 MHz channel, S80 for short) includes four sub-channels whose bandwidths each are 20 MHz: the channels 5, 6, 7, and 8. The channels 5 and 6 are adjacent to each other, the channels 6 and 7 are adjacent to each other, and the channels 7 and 8 are adjacent to each other. One 160 MHz primary channel includes the channels 1 to 8, and one 160 MHz secondary channel includes the channels 9 to 16. It may be understood that, a meaning of one 160 MHz secondary channel is that a bandwidth of the secondary channel is 160 MHz, and a meaning of one 160 MHz primary channel is that a bandwidth of the primary channel is 160 MHz. In the embodiments of this application, a secondary channel may alternatively be referred to as a slave channel, and the 160 MHz secondary channel may alternatively be referred to as the secondary 160 MHz channel.

It should be understood that the channels 1 to 16 may be arranged in a manner shown in FIG. 2, or may be arranged in a plurality of other manners. This is not limited in this application. For convenience of description, in all embodiments of this application, for the channel division in the WLAN, the channel 1 is used as the primary channel. It should be noted that, an 802.11 system supports various channel widths with different sizes, and the bandwidth may be one of consecutive bandwidths of 20 MHz, 40 MHz, 80 MHz, and 160 MHz, non-consecutive bandwidths of 80 MHz+80 MHz, or 320 MHz. In the next-generation 802.11 standard, the channel bandwidth may alternatively be another bandwidth. Optionally, a channel division method thereof may be similar to that of the foregoing 320 MHz channel, and details are not described herein again. Optionally, the foregoing 320 MHz channel includes two 160 MHz channels, and any 160 MHz channel may be divided into resource units by using a specification of the 802.11ax standard.

A channel bandwidth supported by the first station having the first capability set is a first bandwidth, and the first bandwidth may be: 20 MHz, 40 MHz, 80 MHz, 160 MHz, or 80 MHz+80 MHz. The first bandwidth may be punctured or may not be punctured. The first bandwidth may use the division method shown in FIG. 2. A channel bandwidth supported by the second station having the second capability set is a second bandwidth, and the second bandwidth may be: 20 MHz, 40 MHz, 80 MHz, 160 MHz, 80 MHz+80 MHz, 240 MHz, 320 MHz, or another bandwidth. The second bandwidth may be punctured or may not be punctured. The second bandwidth may use the division method shown in FIG. 2. Because the second standard supported by the second station may be backward compatible with the first standard supported by the first station, the second bandwidth supported by the second station includes the first bandwidth supported by the first station, and in terms of frequency domain, the second bandwidth is greater than the first bandwidth. For example, the first bandwidth is 80 MHz, and is the 80 MHz primary channel in FIG. 2, and the second bandwidth is 160 MHz, and is the 160 MHz primary channel in FIG. 2; or the first bandwidth is 80 MHz, and is the 80 MHz primary channel in FIG. 2, and the second bandwidth is 320 MHz, and is the 320 MHz channel in FIG. 2, including the 160 MHz primary channel and the 160 MHz secondary channel.

It should be noted that, in this application, the first bandwidth and/or the second bandwidth may be consecutive or may be non-consecutive in frequency domain. For example, the 160 MHz channel may include two non-consecutive 80 MHz channels or one consecutive 160 MHz channel; the 240 MHz channel may include one 160 MHz channel and one 80 MHz channel that are non-consecutive, or three non-consecutive 80 MHz channels, or one consecutive 240 MHz channel; and the 320 MHz channel may include two non-consecutive 160 MHz channels, or one 160 MHz channel and two 80 MHz channels that are non-consecutive, or four non-consecutive 80 MHz channels, or one consecutive 320 MHz channel. This definition is applicable to subsequent embodiments in this application.

The 802.11ax protocol introduces an orthogonal frequency division multiple access (OFDMA) mechanism. The foregoing channels supported by 802.11ax may be divided into one or more resource units (resource units, RUs) to be allocated to one or more stations for data transmission, thereby implementing OFDMA transmission. Usually, in 802.11ax, the OFDMA transmission includes OFDMA uplink transmission and OFDMA downlink transmission. The OFDMA uplink transmission introduced by 802.11ax includes a trigger frame based scheduling uplink transmission method, and a flow thereof includes: An AP first sends a trigger frame, where the trigger frame includes resource indication information of a resource unit used by a station that is scheduled to perform the OFDMA uplink transmission. The entire trigger frame is divided into a common field and user information fields. The common field includes common information that all STAs need to read, and each of the user information fields includes information that each STA separately needs to read, for example, indication information of a resource unit. After receiving the trigger frame, the STA supporting the 802.11ax standard sends a high efficient trigger based data packet (HE TB PPDU) based on the resource indication information carried in the trigger frame. A flow of the OFDMA downlink transmission introduced by the 802.11ax standard includes: An access point sends a downlink data packet including data of a plurality of stations, where the data of the plurality of stations is carried on corresponding resource units, and stations receiving the downlink data packet obtain data of the stations on the corresponding RUs.

Figure 3:
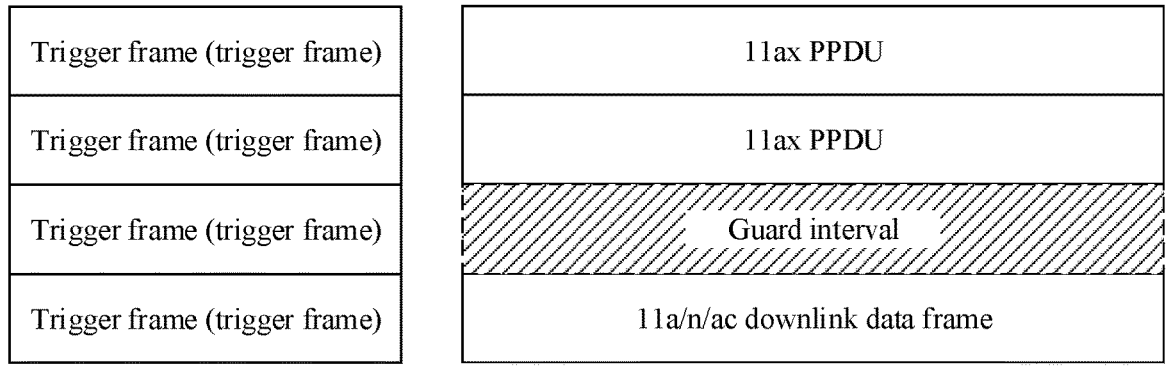
FIG. 3 is a schematic diagram of a hybrid transmission method according to an embodiment of this application.

However, as shown in FIG. 1, in one BSS, one access point 105 may be associated with the second station (for example, the STA 103 and the STA 104) supporting the second standard and the first station (for example, the STA 101 and the STA 102) supporting the first standard, and hybrid transmission of stations supporting different standards may be implemented in a plurality of manners. In a first scenario, the first standard is 802.11a/n/ac, the first station is a station supporting 802.11a/n/ac, the second standard is 802.11ax, and the second station is a station supporting 802.11ax. The access point obtains a channel, and a bandwidth of the channel is greater than the first bandwidth supported by the first station. In an implementation, for example, as shown in FIG. 3, the access point schedules the second station by using the OFDMA mechanism of 802.11ax. To be specific, the AP sends a trigger frame, where the trigger frame schedules the 11ax station to receive, on a secondary channel after an SIFS since transmission of the trigger frame ends, the data sent by the AP, and when the AP sends, on the secondary data, the data to the station supporting 11ax, the AP further sends data, on a primary channel, the station supporting 11a/n/ac. The AP sends the data to the 11ax station and the 11a/n/ac station in an FDMA manner, and a particular guard band is reserved between the data sent to the 11ax station and the data sent to the 11a/n/ac station, to prevent interference brought by signal leakage between each other. However, when this implementation is used, there is a guard interval between the data of 11ax and the data of 11a/n/ac, wasting spectrums. Because the 11a/n/ac station cannot accept uplink scheduling of the AP, this implementation is applicable only to downlink transmission.

In a second scenario, the first standard is 802.11ax, the first station is a station supporting 802.11ax, the second standard is 802.11be, and the second station is a station supporting 802.11be or a station backward compatible with 802.11be. In the second scenario, when the access point obtains a channel, and a bandwidth of the channel is greater than the first bandwidth supported by the first station, if the access point schedules, by using the OFDMA mechanism of 802.11ax, the first station to perform uplink data transmission or sends, by using the OFDMA mechanism of 802.11ax, downlink data to the first station, the part of bandwidth (namely, the first bandwidth) supported by the first station can be used at most. Therefore, even if another bandwidth in the channel is idle, the second station cannot be scheduled by using the another bandwidth to perform data transmission. Consequently, channel resources are not fully utilized, wasting frequency domain resources. For the second case, for ease of description, in this application, the station supporting 802.11ax may be referred to as a high efficiency station (HE STA), and a station supporting 802.11be or a station backward compatible with the 802.11be standard may be referred to as an extremely high throughput station (EHT STA).

The solutions of the embodiments of this application can support stations supporting different standards in performing OFDMA uplink transmission or downlink transmission, to improve channel resource utilization. For the second scenario, by using the solutions of the embodiments of this application, the access point can communicate with another station by fully utilizing a bandwidth that cannot be fully utilized by the station supporting 802.11ax, and no guard band needs to be specified. Therefore, a channel can be fully utilized to improve frequency domain resource utilization.

The following describes the solutions in the embodiments with reference to more accompanying drawings. The aspects described in this specification may be used as a part of the IEEE 802.11 protocol, especially the 802.11 protocol that supports orthogonal frequency division multiple access communication.

Figure 4:
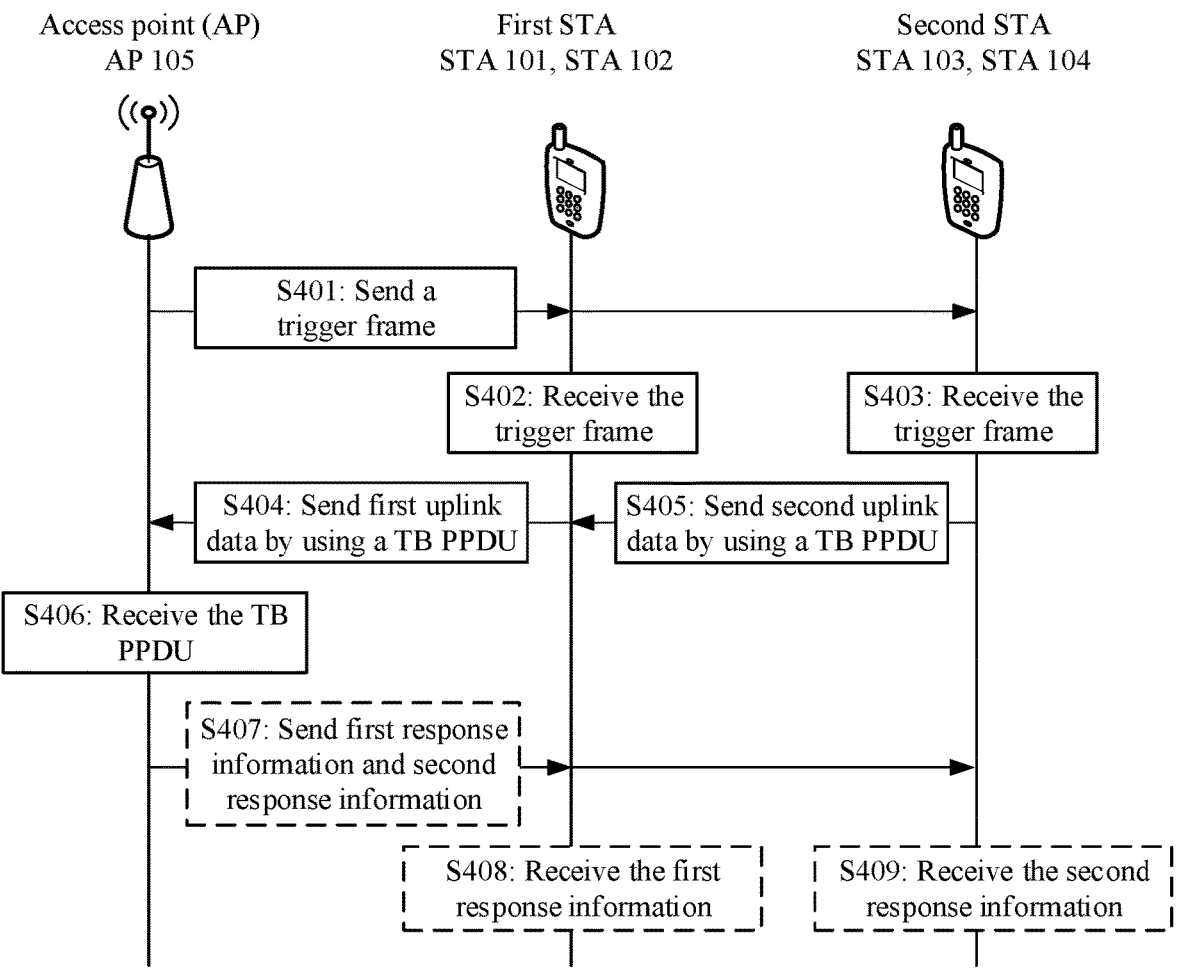
FIG. 4 is a schematic flowchart of an OFDMA uplink hybrid transmission method according to an embodiment of this application.

This embodiment provides an OFDMA uplink hybrid transmission method. FIG. 4 is a schematic flowchart of an OFDMA uplink hybrid transmission method according to this embodiment.

S401: An access point (AP) sends a trigger frame, where the trigger frame is used to trigger a first STA supporting a first standard and a second STA supporting a second standard to perform OFDMA uplink transmission.

For example, the AP may be the AP 105 in FIG. 1, there may be a plurality of scheduled first STAs, for example, the STA 101 and the STA 102 shown in FIG. 1, and there may also be a plurality of scheduled second STAs, for example, the STA 103 and the STA 104 shown in FIG. 1. For example, the access point (AP) not only supports 802.11ax, but also supports 802.11be. The first STA supports the 802.11ax standard, and may be referred to as an HE STA. The second STA supports the 802.11be standard, and may be referred to as an EHT STA.

Specifically, the first STA supports a first bandwidth, and the second STA supports a second bandwidth. In terms of frequency domain, the second bandwidth is greater than the first bandwidth. In other words, in addition to the first bandwidth, the second bandwidth further includes another bandwidth. In an example, the first bandwidth is primary 20 MHz, the second bandwidth includes a primary 20 MHz channel, and the second bandwidth includes but is not limited to any one of 40 MHz, 80 MHz, 160 MHz, 240 MHz, or 320 MHz. In another example, the first bandwidth is 40 MHz, and the second bandwidth includes but is not limited to any one of 80 MHz, 160 MHz, 240 MHz, or 320 MHz. In still another example, the first bandwidth is 80 MHz, and the second bandwidth includes but is not limited to any one of 160 MHz, 240 MHz, or 320 MHz. In still another example, the first bandwidth is 160 MHz, and the second bandwidth is 240 MHz or 320 MHz.

Optionally, the first standard is 802.11ax, the second standard is 802.11be, the first STA is an HE STA, and the second STA is an EHT STA. In an example, in this embodiment, the bandwidth supported by the HE station may be 160 MHz, and the bandwidth supported by the EHT STA is a channel greater than 160 MHz (for example, 320 MHz or 240 MHz). The bandwidth supported by the HE station may alternatively be less than 160 MHz. For example, when the associated HE station does not support 160 MHz, the bandwidth supported by the HE station herein may be 80 MHz, and the bandwidth supported by the EHT STA is a channel greater than 80 MHz (for example, 160 MHz or 320 MHz). In another example, when the HE station associated with the AP is a station supporting only the bandwidth of 20 MHz, the bandwidth supported by the HE station herein is 20 MHz, and the bandwidth supported by the EHT STA is a channel greater than 20 MHz (for example, 80 MHz, 160 MHz, or 320 MHz).

The first bandwidth and the second bandwidth may be divided into at least one resource unit (RU) according to a preset rule. Optionally, the preset rule may be a division rule specified by the 802.11ax standard. The first bandwidth includes a first RU, and the second bandwidth includes a second RU. The trigger frame is specifically used to trigger the first STA to send first uplink data on the first RU, and is used to trigger the second STA to send second uplink data on the second RU. In other words, the first STA supports the first bandwidth, and the first STA is scheduled to send the first uplink data on the first RU located in the first bandwidth; and the second STA supports the second bandwidth, and the second STA is scheduled to send the second uplink data on the second RU located in the second bandwidth. There may be a plurality of scheduled second stations. There may also be a plurality of second RUs. That the second RUs are located in the second bandwidth includes a plurality of cases. In a first case, the plurality of second RUs are all also located in the first bandwidth. In other words, the second STAs and the first STA share the first bandwidth. In this case, the second bandwidth is equal to the first bandwidth. In a second case, the plurality of second RUs are all located in another bandwidth different from the first bandwidth in the second bandwidth. In other words, when the second STAs and the first STA perform OFDMA hybrid transmission, different frequency bands are separately used. In a third case, some of the plurality of second RUs are located in the first bandwidth, and other second RUs are located in another bandwidth. In other words, some of the second STAs and the first STA share the first bandwidth to perform the OFDMA transmission, and the other second STAs perform the OFDMA transmission by using the another bandwidth. For the second and third cases, the second STAs can communicate with the AP by fully utilizing the bandwidth that is not supported by the first STA, so that channel utilization can be improved.

For example, as shown in FIG. 2, the first bandwidth is an 80 MHz primary channel, and the second bandwidth is a 160 MHz primary channel, which includes the 80 MHz primary channel and further includes an 80 MHz secondary channel. In frequency domain, the first RU is located on the 80 MHz primary channel. Optionally, the second RUs may be located on the 80 MHz primary channel. Optionally, the second RUs are located on the 80 MHz secondary channel. Optionally, some of the second RUs may be located on the 80 MHz primary channel, and the other second RUs are located on the 80 MHz secondary channel. For the first case, the second STAs and the first STA share the 80 MHz primary channel, and for the second and third cases, the second STAs can communicate with the AP by fully utilizing the bandwidth that is not supported by the first STA, so that channel utilization can be improved.

Correspondingly, in S402, the first STA receives the trigger frame; and in S403, the second STA receives the trigger frame.

S404: The first STA sends the first uplink data in response to the trigger frame by using a TB PPDU based on the trigger frame.

The first STA sends the trigger based physical layer protocol data unit (TB PPDU) based on the trigger frame.

S405: The second STA sends the second uplink data in response to the trigger frame by using a TB PPDU based on the trigger frame. The second STA sends the trigger based physical layer protocol data unit (TB PPDU) based on the trigger frame.

S406: The AP receives the TB PPDU, where a bandwidth of the TB PPDU is the second bandwidth, and the TB PPDU includes the first uplink data sent by the first STA in response to the trigger frame and the second uplink data sent by the second STA in response to the trigger frame.

Optionally, the method further includes S407: The access point sends first response information for the first uplink data and second response information for the second uplink data. Correspondingly, the method includes S408: The first station receives the first response information; and S409: The second station receives the second response information. In an example, the AP may acknowledge the first station and the second station in a manner of multi-user block acknowledgement (multi-user block acknowledgement, MBA). Optionally, an MBA frame is a multi-user block acknowledgement frame in the 11ax standard, and the first station may be an HE STA.

The trigger frame in S401 may have the following two nonrestrictive implementation methods. Method 1: separately triggering two types of stations by using one trigger frame. Method 2: triggering two types of stations respectively by using at least two trigger frames. The following describes the following two methods in detail.

Method 1: triggering two types of stations by using one trigger frame.

The trigger frame sent by the AP may deceive the HE station, so that the HE station considers the trigger frame as a trigger frame of 802.11ax. In this way, the HE station can receive and parse the trigger frame based on a specification of the 802.11ax standard.

Figure 5A:
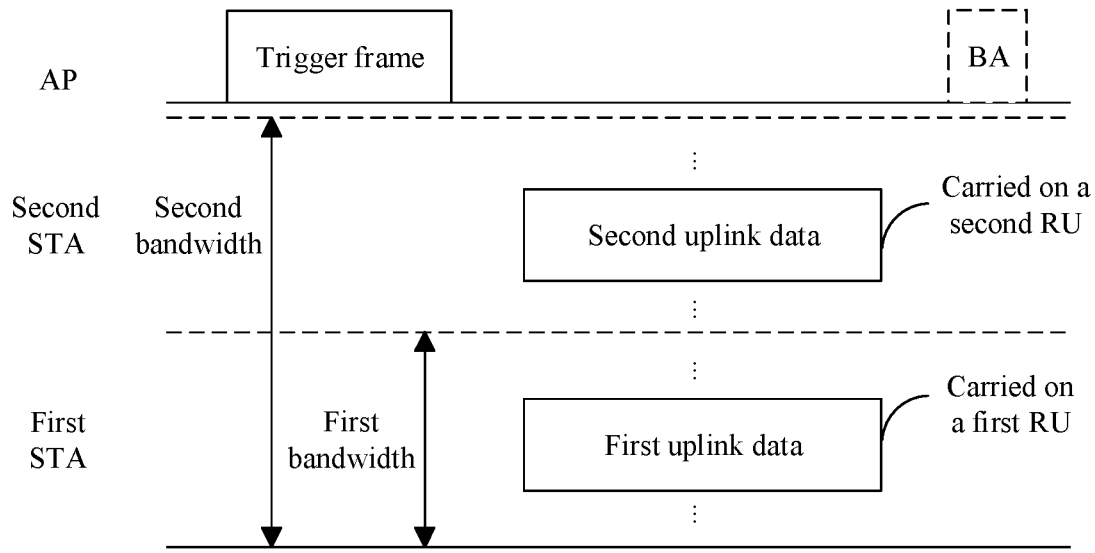
FIG. 5a shows an example of an OFDMA uplink hybrid transmission method according to an embodiment of this application.

This trigger frame not only includes an association identifier and resource allocation information of the HE station, but also includes an association identifier and resource allocation information of the EHT station, so that scheduling of OFDMA uplink hybrid transmission of the HE STA and the EHT STA can be implemented by using one trigger frame. An example of triggering two types of stations by using one trigger frame may be shown in FIG. 5a. The trigger frame sent by the AP triggers the first STA to send the first uplink data on the first RU, and triggers the second STA to send the second uplink data on the second RU. Optionally, the AP sends acknowledgement information.

In OFDMA uplink transmission, to help the HE STA accurately determine a size of the first RU used by the HE STA to perform uplink transmission and a location of the first RU in frequency domain, the HE STA further needs to determine the first bandwidth. To help the EHT STA determine a size of the second RU used by the EHT STA to perform uplink transmission and a location of the second RU in frequency domain, the EHT STA also needs to determine the second bandwidth. Therefore, the trigger frame needs to carry indication information that can be used for determining the first bandwidth and the second bandwidth. In an example, the trigger frame includes a common information field. The common information field includes an uplink bandwidth (uplink bandwidth, UL BW) field and a first reserved bit. The uplink bandwidth field and the first reserved bit are jointly used for determining, by the second STA, the second bandwidth. The uplink bandwidth field is separately used for determining, by the first STA, the first bandwidth. In other words, the EHT STA may determine the second bandwidth jointly based on the uplink bandwidth field and the first reserved bit, and the HE STA may determine the first bandwidth by using a specification of the 802.11ax protocol based on the uplink bandwidth field. Certainly, the EHT STA may alternatively determine the first bandwidth based on the uplink bandwidth field according to the specification of the 802.11ax protocol. Therefore, the EHT STA may obtain sizes of the first bandwidth and the second bandwidth.

The uplink bandwidth field includes 2 bits, and the first reserved bit includes 1 bit. Optionally, the first reserved bit may be a reserved bit B63 in the common information field in the trigger frame shown in FIG. 6. Optionally, the second reserved bit may alternatively be a newly added bit in the trigger frame, and is located in a resource unit allocation field, or may be another case, or the like.

A second-bandwidth indication including the uplink bandwidth field and the first reserved bit includes a total of 3 bits. There may be a plurality of correspondences between values of the 3 bits and the size of the second bandwidth. Manners of determining the second bandwidth by the second station by using the 3 bits include but are not limited to:

In a first implementation, the second station determines that the second bandwidth is 320 MHz based on the uplink bandwidth field and the first reserved bit, where the second bandwidth may include two 160 MHz channels, or may include one 160 MHz channel and two 80 MHz channels, or may include four 80 MHz channels. For example, correspondences between the uplink bandwidth field and the reserved bit and the first bandwidth and the second bandwidth are shown in Table 1:

TABLE 1

| Uplink bandwidth field | B63 | First bandwidth | Second bandwidth |
|---|---|---|---|
| 00 | 1 | 20 MHz | 320 MHz |
| 01 | 1 | 40 MHz | 320 MHz |
| 10 | 1 | 80 MHz | 320 MHZ |
| 11 | 1 | 160 MHz or (80 + 80) MHz | 320 MHZ |

In a second implementation, the second station determines that the second bandwidth is any bandwidth greater than the first bandwidth based on the uplink bandwidth field and the first reserved bit, and the specific bandwidth may be specified by a standard. For example, correspondences between the uplink bandwidth field and the reserved bit and the first bandwidth and the second bandwidth are shown in Table 2:

TABLE 2

| Uplink bandwidth field | B63 | First bandwidth | Second bandwidth |
|---|---|---|---|
| 00 | 1 | 20 MHz | One of 40 MHz, 80 MHz, 160 MHz, or 320 MHz, and the specific one is specified by the standard |
| 01 | 1 | 40 MHz | One of 80 MHz, 160 MHz, or 320 MHz, and the specific one is specified by the standard |
| 10 | 1 | 80 MHz | One of 160 MHz or 320 MHz, and the specific one is specified by the standard |
| 11 | 1 | 160 MHz or (80 + 80) MHz | 320 MHZ |

In a third implementation, the second station determines that the second bandwidth is twice the first bandwidth based on the uplink bandwidth field and the first reserved bit. For example, correspondences between the uplink bandwidth field and the reserved bit and the first bandwidth and the second bandwidth are shown in Table 3:

TABLE 3

| Uplink bandwidth field | B63 | First bandwidth | Second bandwidth |
|---|---|---|---|
| 00 | 1 | 20 MHz | 40 MHz |
| 01 | 1 | 40 MHz | 80 MHz |
| 10 | 1 | 80 MHz | 160 MHz |
| 11 | 1 | 160 MHz or (80 + 80) MHz | 320 MHz |

In a fourth implementation, when a value of the bandwidth indication including the uplink bandwidth field and the first reserved bit is a first value or a second value, it indicates that the second bandwidth is 160 MHz, and when the value of the bandwidth indication including the uplink bandwidth field and the first reserved bit is a third value or a fourth value, it indicates that the second bandwidth is 320 MHz. For example, correspondences between the uplink bandwidth field and the reserved bit and the first bandwidth and the second bandwidth are shown in Table 4:

TABLE 4

| Uplink bandwidth field | B63 | First bandwidth | Second bandwidth |
|---|---|---|---|
| 00 | 1 | 20 MHz | 160 MHz |
| 01 | 1 | 40 MHz | 160 MHz |
| 10 | 1 | 80 MHz | 320 MHz |
| 11 | 1 | 160 MHz or (80 + 80) MHz | 320 MHz |

For the foregoing several implementations, when the value of the first reserved bit is 0, bandwidths corresponding to four values of the uplink bandwidth field are determined based on the existing 802.11ax protocol. When the value of the first reserved bit is 0, the second bandwidth determined by the second station is equal to the first bandwidth. In other words, the first RU allocated to the first station and the second RU allocated to the second station are both located in the bandwidth supported by the first station. The first station does not need to consider the value of the first reserved bit. Instead, based on the specification of the 802.11ax standard, the first station parses only the uplink bandwidth field to determine the first bandwidth. In addition, it should be noted that, the correspondences between the values of the 3 bits and the size of the second bandwidth may further include other correspondences, and are not limited to those listed in this embodiment of this application.

To enable the first station to obtain the size and the location of the first RU, the trigger frame may further include a first user information field. The first user information field includes a first resource unit allocation field and a first association identifier (association identifier, AID) field, the first AID field includes an identifier of the first STA, and the first resource unit allocation field is used for indicating the first RU allocated to the first STA to perform OFDMA uplink transmission.

To enable the second station to obtain the size and the location of the second RU, the trigger frame further includes a second user information field, the second user information field includes a second resource unit allocation field, a second AID field, and a second reserved bit, the second AID field includes an identifier of the second STA, and the second resource unit allocation field and the second reserved bit are jointly used for indicating the second RU allocated to the second STA for performing OFDMA uplink transmission. Specifically, the second reserved bit is used for indicating that the second RU is located on a primary 160 MHz channel or a secondary 160 MHz channel; and the second resource unit allocation field is used for indicating the size and the location of the second RU on the 160 MHz channel indicated by the second reserved bit. For example, when the second RU is located on the primary 160 MHz, a value of the second reserved bit is 0, and when the second RU is located on the secondary 160 MHz channel, the value of the second reserved bit is 1. Optionally, the second reserved bit may be a reserved bit B39 in the second user information field in the trigger frame shown in FIG. 6. Optionally, the second reserved bit may alternatively be a newly added bit in the trigger frame, and is located in the resource unit allocation field, or may be another case, or the like. For example, the first bandwidth is primary 80 MHz, the second bandwidth is 320 MHz, and the first RU is located in the primary 80 MHz. If the second RU is located in the secondary 80 MHz, the value of the second reserved bit is 0; or if the second RU is located in the secondary 160 MHz, the value of the second reserved bit is 1. Certainly, the correspondence between the value of the second reserved bit and whether the second RU is located on the primary or secondary 160 MHz channel may be changed to the opposite.

It should be noted that, the first resource unit allocation field and the second resource unit allocation field may indicate the sizes and the locations of the RUs located on the 160 MHz channel. Refer to the 802.11ax standard for a specific indication method. Therefore, the HE STA may comply with the specification of the 802.11ax standard for parsing the first resource unit allocation field, and the EHT STA also complies with the specification of the 802.11ax standard for parsing the second resource unit allocation field. In other words, after receiving the trigger frame, the EHT STA determines, based on the second reserved bit, whether the second RU is located on the primary 160 MHz channel or the secondary 160 MHz channel, and then determines, based on the second resource unit allocation field, the specific second RU on the 160 MHz channel indicated by the second reserved bit, namely, determines the size and the location of the second RU on the 160 MHz indicated by the second reserved bit.

Figure 6:
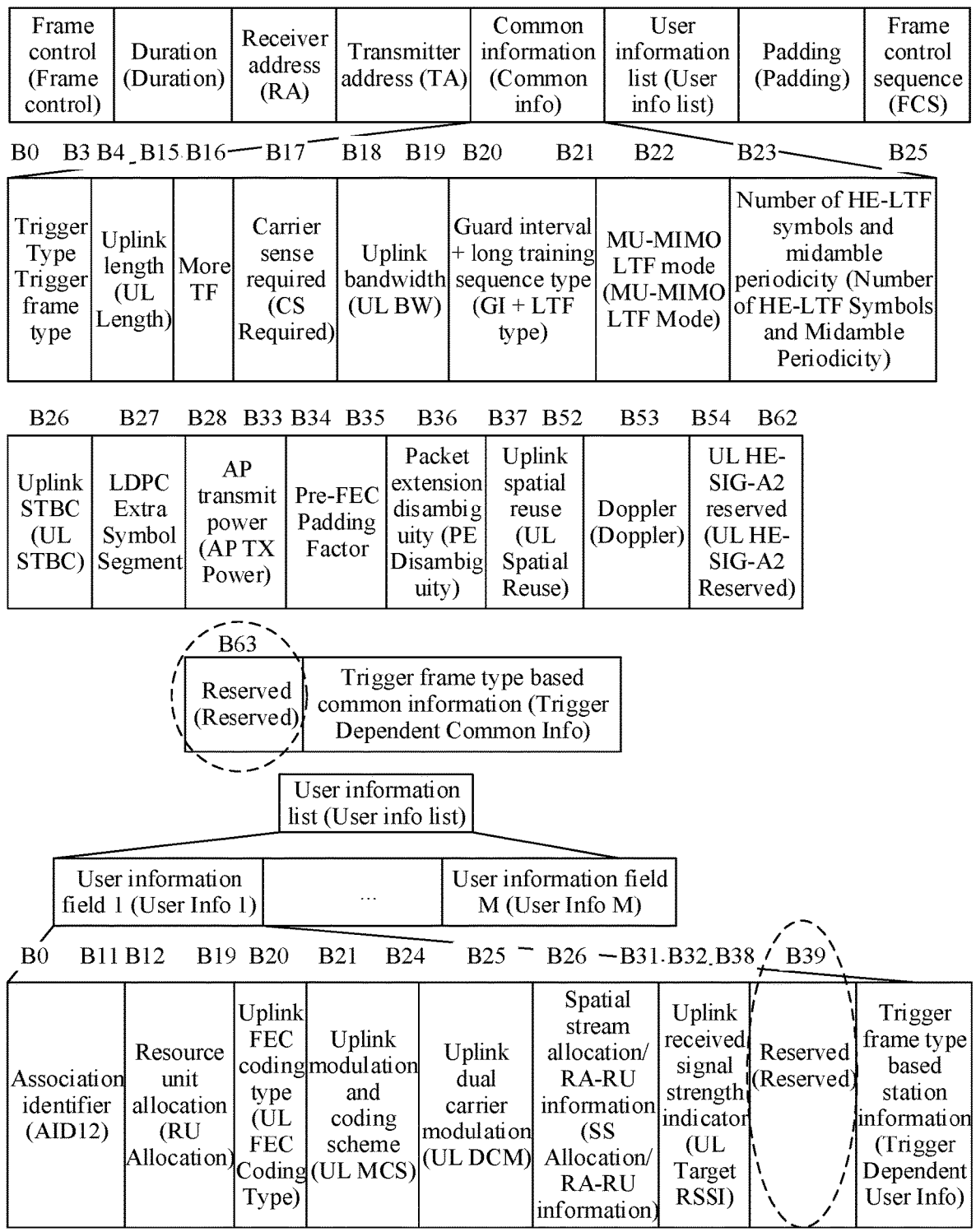
FIG. 6 is a schematic diagram of a frame structure of a trigger frame according to an embodiment of this application.

Method 1 of sending the trigger frame may be compatible with use of a trigger frame format of 802.11ax, for example, the trigger frame shown in FIG. 6, to implement OFDMA uplink hybrid transmission, so that complexity of parsing the trigger frame by the second station can be reduced. In addition, the reserved bits in the trigger frame are reused, so that the second station can determine the second bandwidth and the size and the location of the second RU, to reduce signaling overheads without changing a frame structure of the trigger frame, and also avoid parsing exception of the first station.

Method 2: triggering two types of stations by using at least two trigger frames. For ease of description, in this embodiment, an example in which the first station is an HE station and the second station is an EHT station is used for description.

The trigger frame sent by the AP includes at least two trigger frames. In other words, the AP may send at least two trigger frames respectively by using at least two RUs in an MU PPDU (multi-user PPDU, MU PPDU), for example, an HE MU PPDU.

The HE MU PPDU includes an HE-SIG B (high efficiency signaling B, HE SIG B) field. The HE-SIG B field includes resource allocation information, used for indicating sizes and locations of the at least two RUs. The HE-SIG B field further includes at least two user information fields corresponding to the at least two RUs. The at least two RUs include a third RU and a fourth RU. The at least two trigger frames include a first trigger frame and a second trigger frame. The first trigger frame is used to trigger a STA supporting the first standard (or the STA supporting the first standard and the STA supporting the second standard), and the second trigger frame is used to trigger the STA supporting the second standard, and does not trigger the STA supporting the first standard. The HE-SIG B field further includes a third user information field corresponding to the third RU and a fourth user information field corresponding to the fourth RU. The third RU is used to carry the first trigger frame, and the fourth RU is used to carry the second trigger frame.

After receiving the MU PPDU, the first STA parses the resource allocation information in the HE-SIG B, to obtain a size and a location of the third RU, so as to parse the third RU to obtain the first trigger frame. After receiving the MU PPDU, the second STA parses the resource allocation information in the HE-SIG B, to obtain a size and a location of the fourth RU, so as to parse the fourth RU to obtain the second trigger frame.

The HE station cannot parse two RUs in the current 802.11ax standard. Therefore, usually, when the HE station parses the MU PPDU, the HE station first confirms, based on the HE-SIG B, whether the HE station is scheduled. If the HE station confirms that the HE station is scheduled, the HE station parses data on a corresponding scheduled RU. If the HE station confirms that the HE station is not scheduled, the HE STA parses broadcast information on an RU corresponding to a user information field that includes an AID field whose value is 0 in the HE-SIG B. If values of two AID fields in the HE-SIG B are 0, it goes beyond a parsing capability of the HE STA, leading to an exception. Therefore, to avoid, to the greatest extent, the parsing exception caused by going beyond the parsing capability of the HE station, the following manners may be used:

In a first manner, a special AID value that cannot be understood by the HE station may be used to avoid the exception. For example, the AP may set a fourth AID field in the fourth user information field corresponding to the fourth RU in the HE-SIG B field to a non-0) special value. Because the HE STA cannot understand the special value, the HE STA parses only data on the third RU, and therefore a parsing exception is not caused. Optionally, the non-(special value is any one of 2008 to 2044, for example, 2008 or 2044.

In a second manner, if the AP sets both the AID field in the third user information field and the AID field in the fourth user information field to 0, the AP needs to carry the first trigger frame on an RU corresponding to the user information field whose location is located ahead in the two user information fields. For example, in the HE-SIG B, the third user information field is located before the fourth user information field. An exception is not caused when the AP carries the first trigger frame on the third RU. Because the HE STA reads only broadcast information in the RU located ahead and ignores broadcast information in other RUs, the parsing capability of the HE STA is not exceeded.

It should be noted that, a manner of indicating, by using a special AID value, that the second trigger frame is a broadcast frame for the EHT STA is not only applicable to a case of hybrid transmission, but also applicable to a case of scheduling the EHT STA alone to perform OFDMA uplink transmission or another case.

The first trigger frame and the second trigger frame may be broadcast frames or may be unicast frames. If the first trigger frame and the second trigger frame are both unicast frames, a third AID field in the third user information field is an AID of the first STA, and the fourth AID field in the fourth user information field is an AID of the second STA.

Figure 5B:
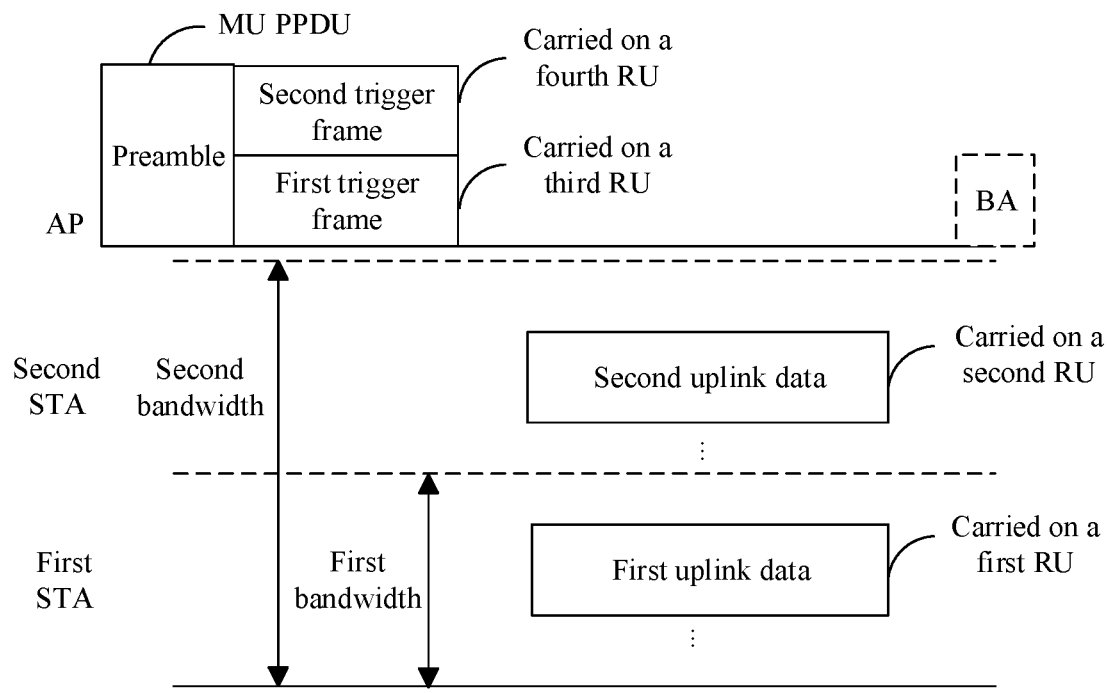
FIG. 5b shows an example of another OFDMA uplink hybrid transmission method according to an embodiment of this application.

FIG. 5b is a schematic flowchart of triggering hybrid transmission by using two trigger frames as an example. The MU PPDU sent by the AP includes the first trigger frame and the second trigger frame. The first trigger frame is carried on the third RU of the MU PPDU. The second trigger frame is carried on the fourth RU of the MU PPDU. The first trigger frame is used by the first STA to send the first uplink data on the first RU, and the second trigger frame schedules the second STA to send the second uplink data on the second RU. Optionally, the first trigger frame may further trigger the second STA to also send uplink data on another RU in the first bandwidth.

The first trigger frame may use the trigger frame format supported by the 802.11ax standard, for example, the trigger frame shown in FIG. 6. The first trigger frame may include the first user information field (including the first AID field and the first resource unit allocation field). Refer to the description in method 1 for functions of the fields in the first user information field. Optionally, the second trigger frame may use the trigger frame format supported by 802.11ax, for example, the trigger frame shown in FIG. 6, or may use a new trigger frame format, for example, a trigger frame format supported by 802.11be. The second trigger frame may include the second user information field (including the second AID field and the second resource unit allocation field). Refer to the description in method 1 for functions of the fields in the second user information field.

If the trigger frames are sent in the manner of method 2, the first STA and the second STA can be scheduled more flexibly.

When the trigger frame is used to trigger uplink OFDMA-based random access (UL OFDMA-based random access, UORA), one user information field includes an association identifier (AID) field, a resource unit allocation (RU allocation) field, and a random access resource unit information (RA-RU information) field, and a specific AID value may be used to indicate that a plurality of consecutive RUs starting from an RU indicated by the resource unit allocation field are random access resource units (RA-RUs) for a station to perform random access, where a Number Of RA-RU field in the RA-RU information is used for indicating a quantity of the plurality of consecutive RA-RUs. For the first station and the second station, different special AID values may be separately used for indication, to distinguish the RA-RUs for the first station to perform random access from the RA-RUs for the second station to perform random access.

In an example, when the value of the AID field is a first AID value (for example, 0 or 2045), it indicates that a plurality of RA-RUs may be used for the first STA (or the first STA and the second STA) to perform random access. Optionally, the first station may include associated and unassociated first stations. First AID value=0 indicates that the RA-RUs may be used for the associated first station, and first AID value=2045 indicates that the RA-RUs may be used for the unassociated first station.

When the value of the AID field is a second AID value (for example, 2044 or 2047), it indicates that a plurality of RA-RUs may be used for the second STA to perform random access. Optionally, the second station may include associated and unassociated second stations. For example, when the second AID value is 2044, it may indicate that the RA-RUs may be used for the associated second station, and when the second AID value is 2047, it indicates that the RA-RUs may be used for the unassociated second station.

Certainly, it may be understood that, the foregoing indication method may be applied to a case in which a trigger frame is sent by using method 1 and method 2, or may be applied to another case in which a trigger frame is sent. In addition, the second AID value may alternatively be another value. This is not limited in this embodiment of this application.

Description is provided by using the foregoing method 1 or method 2 as an example. The access point (AP) may set the value of the first AID field in the first user information field to 0, to indicate that a plurality of consecutive RA-RUs starting from the first RU are available RA-RUs of the associated first station. The access point (AP) may set the value of the first AID field to 2045, to indicate that a plurality of consecutive RA-RUs starting from the first RU are available RA-RUs of the unassociated first station. The access point (AP) may set the value of the second AID field in the second user information field to 2044, to indicate that a plurality of consecutive RA-RUs starting from the second RU are available RA-RUs of the associated second station. The access point (AP) may set the value of the second AID field to 2047, to indicate that a plurality of consecutive RA-RUs starting from the second RU are available RA-RUs of the unassociated second station.

The AID field may alternatively be denoted as AID 12. Because AID 12=0) and AID 12=2045 are used for indicating that the RA-RUs are allocated to the HE associated station and the HE unassociated station. When initial locations of the corresponding RA-RUs exceed a range of primary 160 MHz, or a quantity of the RA-RUs exceeds a possible maximum quantity in primary 160 MHz, the HE station cannot understand the information. Therefore, a problem may occur. After an indication of RA-RUs is newly added for the EHT associated and unassociated stations, the associated HE station may perform UORA by using RA-RUS corresponding to a special value of AID 12 (AID 12=0), the associated EHT station may perform UORA by using RA-RUs corresponding to two special values of AID 12 (AID 12=0) or AID 12=2044), and may perform the UORA flow by using a sum of RA-RUs indicated by AID 12=0) and AID 12=2044, the unassociated HE STA may perform UORA by using RA-RUs corresponding to AID 12=2045, and the unassociated EHT STA may perform UORA by using RA-RUs corresponding to two special AID values (AID 12=2045 and AID 12=2047), and may perform the UORA flow by using a sum of RA-RUs indicated by AID 12=2045 and AID 12=2047.

The following further describes TB PPDU transmission in steps S404 and S405.

Optionally, the TB PPDU further includes a first physical layer preamble sent by the first STA, and a second physical layer preamble sent by the second STA. In hybrid transmission, to avoid impact on parsing, by another station supporting 11ax in a network, the TB PPDU, a physical layer preamble may be sent by using the following methods:

Method 1: An OFDM symbol in the first physical layer preamble is aligned with an OFDM symbol in the second physical layer preamble. Particularly, the first physical layer preamble is the same as the second physical layer preamble. For example, a boundary of each OFDM symbol of the EHT station in the physical layer preamble is aligned with a boundary of each OFDM symbol of the HE station in the physical layer preamble. For example, the EHT station uses a physical layer preamble completely the same as that of the HE station.

Figure 7A:
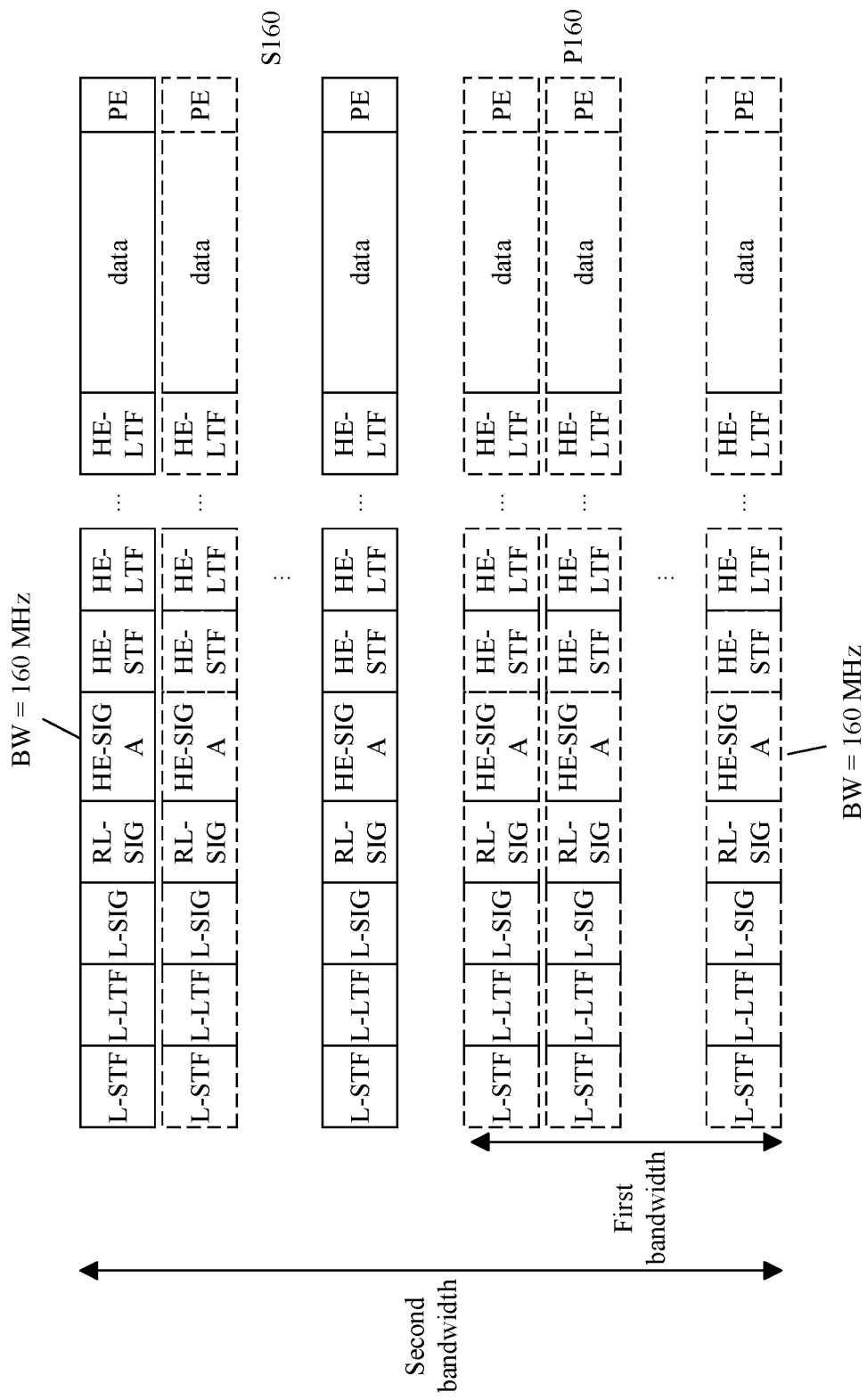
FIG. 7a is a schematic diagram of a structure of a TB PPDU according to an embodiment of this application.

Using an example in which the first bandwidth is a 160 MHz primary channel (P160) and the second bandwidth is a 320 MHz channel (including P160 and S160), FIG. 7a is a schematic diagram of a structure of a TB PPDU. A physical layer preamble on the first bandwidth is the same as a physical layer preamble on the second bandwidth.

Method 2: In a first-bandwidth range supported by the first station, an OFDM symbol in the first physical layer preamble is aligned with an OFDM symbol in the second physical layer preamble, and in a bandwidth range that is not supported by the first station, how the second station sends the second physical layer preamble is not limited.

For example, in the bandwidth range supported by the HE station, a boundary of each OFDM symbol of the EHT station in the physical layer preamble is aligned with a boundary of each OFDM symbol of the HE station in the physical layer preamble, and in the bandwidth that is not supported by the HE station, how the EHT sends the physical preamble is not limited. In a special case, in the bandwidth supported by the HE station, the EHT station uses a physical layer preamble completely the same as that of the HE station. In the bandwidth that is not supported by the HE station, the EHT station uses an EHT physical layer preamble.

Figure 7B:
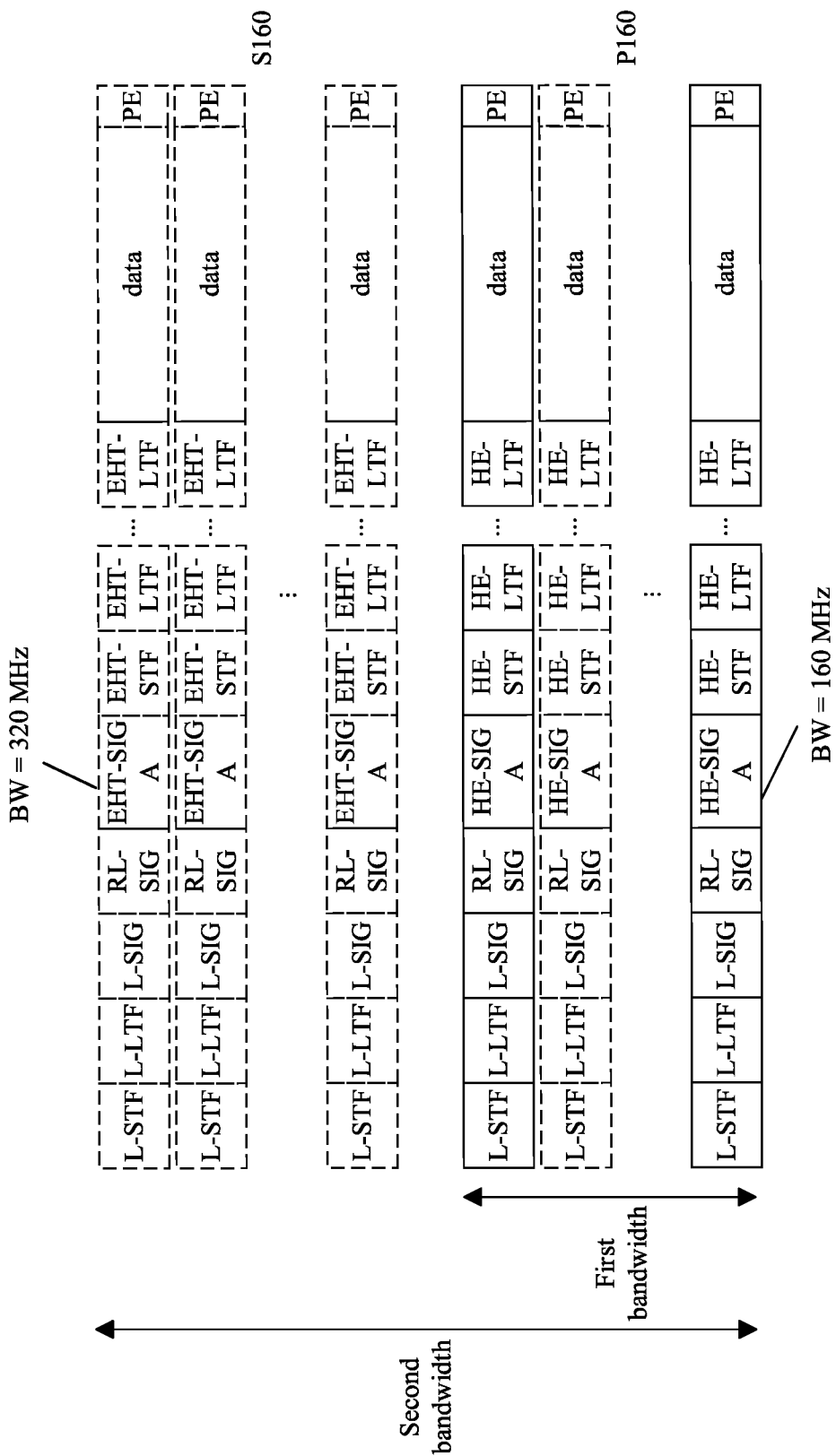
FIG. 7b is a schematic diagram of a structure of another TB PPDU according to an embodiment of this application.

Using an example in which the first bandwidth is a 160 MHz primary channel (P160) and the second bandwidth is a 320 MHz channel (including P160 and S160), FIG. 7b is a schematic diagram of a structure of a TB PPDU. The physical layer preamble on the first bandwidth is completely the same as a physical layer preamble of the HE station. The physical layer preamble on S160 uses the physical layer preamble of the EHT station. It should be noted that, a structure and fields of the physical layer preamble of the EHT station are merely examples.

As shown in FIG. 7a or FIG. 7b, the TB PPDU first includes a legacy preamble (Legacy Preamble, L-Preamble), where the L-preamble includes a legacy short training field (Legacy Short Training Field, L-STF), a legacy long training field (Legacy Long Training Field, L-LTF), and a legacy signaling field (Legacy Signal Field, L-SIG), to ensure backward compatibility, so that a STA supporting a standard of a previous version can understand the part of the legacy preamble. In addition, a repeated legacy signal field (Repeated L-SIG) is also included, which is used to perform automatic detection and increase robustness of the L-SIG for 802.11ax. The preamble further includes an HE-SIG-A (High Efficient Signal Field A, high efficient signal field A), and carries related signaling information required for reading data. An HE-STF (High Efficient Short Training Field, high efficient short training field) and an HE-LTF (High Efficient Long Training Field, high efficient long training field) are subsequently included, which are respectively used for performing AGC (Automatic Gain Control, automatic gain control) and channel measurement in a MIMO (Multiple Input Multiple Output, multiple input multiple output) case. The HE-LTF field may include a plurality of HE-LTF symbols, and is used for performing channel measurement on a plurality of space-time streams. Finally, a data (Data) part is included for carrying a MAC (Medium Access Control, medium access control) frame.

Method 3: If RUs on a same 20 MHz sub-channel are allocated to the first station and the second station, or there is no guard interval greater than a particular threshold between the two RUs, a boundary of each OFDM symbol of the first station in the physical layer preamble is aligned with a boundary of each OFDM symbol of the second station in the physical layer preamble; or if RUs on different 20 MHz sub-channels are allocated to the first station and the second station, and there is a guard interval greater than a particular threshold between the different 20 MHz sub-channels, the boundary of the OFDM symbol of the first station in the physical layer preamble may not be aligned with the boundary of the OFDM symbol of the second station in the physical layer preamble.

For example, when the EHT station and the HE station are scheduled onto a same 20 MHz sub-channel, or when the EHT station and the HE station are not scheduled onto the same 20 MHz sub-channel, but no sufficient guard interval is reserved between the channel of the EHT station and the channel of the HE station, the boundary of each OFDM symbol of the EHT station in the physical layer preamble needs to be aligned with the boundary of each OFDM symbol of the HE station in the physical layer preamble. When the EHT station and the HE station are scheduled onto different 20 MHz sub-channels, and a sufficient guard interval is reserved between the channel of the EHT station and the channel of the HE station, the EHT station may not need to keep the OFDM symbol aligned with the OFDM symbol of the HE station in the physical layer preamble.

It should be noted that, based on an operating principle of a transceiver, "alignment" in the embodiments is essential, and does not need to be strictly limited to have no time difference on the boundary of the foregoing OFDM symbol, provided that the foregoing processing is basically the same in terms of a time dimension.

A main objective of aligning each OFDM symbol in the preamble of the TB PPDU is to avoid impact on normally parsing, by another 11ax station in the network, the TB PPDU. Because an 11ax station is a legacy station in this solution and a parsing manner of the 11ax station cannot be modified, when the 11ax station parses OFDM symbols on a plurality of 20 MHz sub-channels in a bandwidth, if the OFDM symbols are not aligned, the 11ax station cannot determine a correct OFDM symbol starting moment. Consequently, parsing by another 11ax station is affected, and required information cannot be obtained. Therefore, the manner in which OFDM symbol alignment is used or transmitted physical layer preambles are the same can be better compatible with the 802.11ax station, to improve reliability.

By using the method in this embodiment of this application, stations supporting different standards can perform OFDMA uplink transmission. The access point can schedule, by fully utilizing a bandwidth that cannot be fully utilized by the first station (for example, the station supporting 802.11ax), the second station to perform OFDMA uplink transmission, and no guard band needs to be specified. Therefore, a channel can be fully utilized to improve frequency domain resource utilization.

Figure 8:
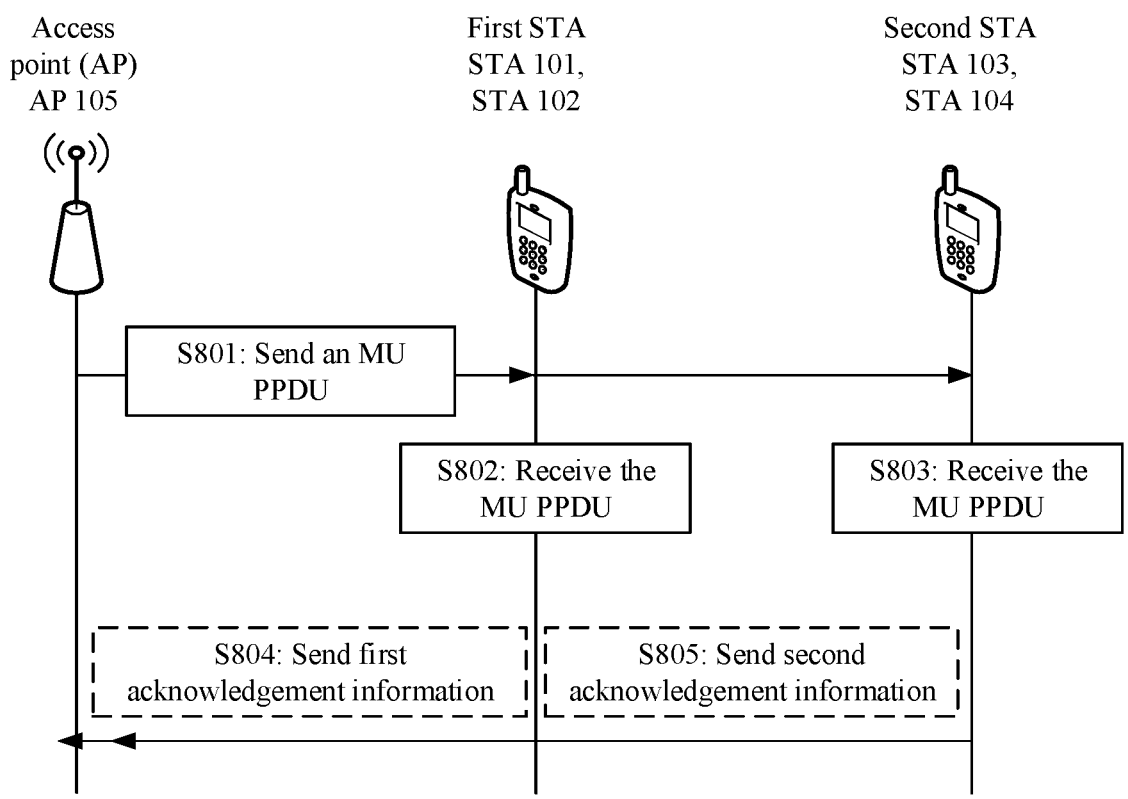
FIG. 8 is a schematic flowchart of an OFDMA downlink hybrid transmission method according to an embodiment of this application.

The foregoing embodiment provides an OFDMA uplink hybrid transmission method. An embodiment of this application provides an OFDMA downlink hybrid transmission method. FIG. 8 is a schematic flowchart of an OFDMA uplink hybrid transmission method according to this embodiment.

S801: An access point (AP) generates and sends a multi-user physical layer protocol data unit (MU PPDU), where the MU PPDU includes first downlink data of a first STA supporting a first standard and second downlink data of a second STA supporting a second standard.

For example, the AP may be the AP 105 in FIG. 1, there may be a plurality of scheduled first STAs, for example, the STA 101 and the STA 102 shown in FIG. 1, and there may also be a plurality of scheduled second STAs, for example, the STA 103 and the STA 104 shown in FIG. 1. For example, the access point (AP) not only supports 802.11ax, but also supports 802.11be. The first STA supports the 802.11ax standard, and may be referred to as an HE STA. The second STA supports the 802.11be standard, and may be referred to as an EHT STA.

The first STA supports a first bandwidth, and the second STA supports a second bandwidth. In terms of frequency domain, the second bandwidth is greater than the first bandwidth. In other words, in addition to the first bandwidth, the second bandwidth further includes another bandwidth. Descriptions of the first STA, the second STA, the first bandwidth, and the second bandwidth are already described in the specification. Details are not described herein again. For example, refer to S401.

The first downlink data is carried on a first RU included in the first bandwidth, and the second downlink data is carried on a second RU included in the second bandwidth. In an example, the first bandwidth is primary 160 MHz (P160), the second bandwidth is 320 MHz (including the primary 160 MHz (P160) and secondary 160 MHz (S160)), the first RU is located in the primary 160 MHz (P160), and the second RU is located in S160. Certainly, some of second RUs are located in P160, and the other second RUs are located in S160.

Correspondingly, in S802, the first STA receives the MU PPDU, and parses out the first downlink data, and in S803, the second STA receives the MU PPDU, and parses out the second downlink data.

Specifically, the first STA obtains a size and a location of the first RU based on an HE SIG field in the MU PPDU, to parse out the first downlink data on the first RU, and the second STA obtains a size and a location of the second RU based on the HE SIG field in the MU PPDU, to parse out the second downlink data on the second RU.

Optionally, in S804, the first STA sends first acknowledgement information, and in S805, the second STA sends second acknowledgement information. The first acknowledgement information and the second acknowledgement information may be sent in a format of a block acknowledgement (BA) frame.

The MU PPDU needs to include a bandwidth indication, so that the first station determines the first bandwidth and the second station determines the second bandwidth, to determine the size and the location of the first RU and the size and the location of the second RU.

For example, the first station is an HE station and the second station is an EHT station. Because the MU PPDU needs to indicate, to the HE station, a bandwidth supported by the HE station, then, how to enable the EHT station to learn of the part of bandwidth occupied by the second downlink data of the EHT station is a problem to be resolved. However, a reserved field in HE SIG A of the MU PPDU cannot be effectively used in this solution, because after the reserved field in HE SIG A is modified, the HE station no longer deciphers any other field other than TXOP and BSS color. Then, in an implementation, the EHT station simultaneously parses the PPDU on two channels at any time. When the EHT station successfully obtains a preamble of the PPDU on a pre-specified secondary channel through synchronization, and also obtains a physical layer preamble (preamble) of the PPDU on a primary 20 MHz channel through synchronization at the same time, it is considered that, at this time, a channel including the pre-specified secondary channel includes physical layer preamble information sent by the AP to the EHT station. In other words, another bandwidth other than the first bandwidth in the second bandwidth includes the physical layer preamble of the EHT station, and the EHT station further obtains a bandwidth occupied by the EHT and RU allocation of the EHT by parsing the physical layer preamble on the specified secondary channel. In another implementation, the AP indicates the bandwidth of the EHT station in a physical layer preamble outside the bandwidth that is not supported by the first station. For example, if the first bandwidth is P160, and the second bandwidth is 320 MHz (including P160 and S160), the AP carries, by using a bandwidth field of the physical layer preamble on S160, the bandwidth occupied by the second downlink data of the EHT station, and further obtains the size and the location of the second RU based on an EHT SIG B field. The foregoing method can enable the HE station to normally parse the physical layer preamble, and can also enable the EHT station to accurately obtain the bandwidth occupied by the EHT station, and to further obtain the RU allocation, thereby parsing out the second downlink data.

The SIG B of the HE station of the MU PPDU includes a content channel (content channel, CC). There are two CCs in an MU PPDU greater than 20 MHz in 11ax, which are denoted as a CC 1 and a CC 2. The CC 1 is used on all odd-numbered 20 MHz channels, and the CC 2 is used on all even-numbered 20 MHz channels. The SIG B on the secondary channel that is not supported by the HE station may continue to use the design of the HE, or may be redesigned. In either manner, a length of a CC on a 20 MHz sub-channel that is not supported by the HE station should be limited, and a maximum length thereof cannot exceed a length of a CC on a 20 MHz sub-channel in a bandwidth supported by the HE station. The reason is that, if the length of the CC on the 20 MHz sub-channel that is not supported by the HE station exceeds the length of the CC on the 20 MHz sub-channel in the bandwidth supported by the HE station, both the CC 1 and the CC 2 need to perform padding to make lengths of SIG B on all 20 MHz sub-channels aligned. However, this causes a failure to a current method for calculating a boundary of the HE SIG B. Consequently, the HE station cannot correctly parse out an ending moment of the HE SIG B.

The MU PPDU may include a first aggregated media access control protocol data unit (aggregated MAC protocol data unit, A-MPDU) carrying the first downlink data and a second A-MPDU carrying the second downlink data.

Optionally, the PPDU further includes a first resource indication for indicating a third RU; the third RU is used by the first STA to send first acknowledgement information in response to the first downlink data, for example, a first BA, and the PPDU further includes a second resource indication for indicating a fourth RU; and the fourth RU is used by the second STA to send second acknowledgement information in response to the second downlink data, for example, a second BA.

Optionally, for the first station, the access point (AP) may allocate, to the first BA of the first A-MPDU by using a triggered response scheduling (triggered response scheduling, TRS) control field in the first A-MPDU, an RU for uplink transmission. For the second station, the AP may allocate, to the second BA of the second A-MPDU by using a TRS control field in the second A-MPDU, an RU for uplink transmission.

Figure 9:
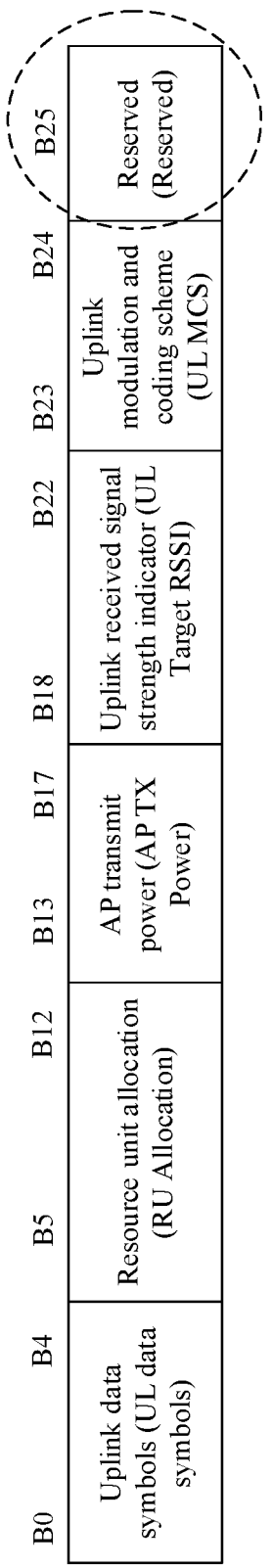
FIG. 9 is a schematic diagram of a structure of a TRS field according to an embodiment of this application.

Optionally, a structure of the TRS field may be shown in FIG. 9. The TRS field includes a resource unit allocation field and a reserved bit B25.

For example, the first station is an HE STA and the second station is an EHT STA. As shown in FIG. 9, the RU allocation field is 8 bits. After a bandwidth is expanded to be greater than 160 MHz, the 8-bit RU allocation field may be insufficient for indicating a plurality of RUs obtained through dividing the bandwidth greater than 160 MHz, and therefore, more bits are required for RU indication. In this embodiment, the reserved field B25 and the RU allocation field are jointly used for indicating RUs in the bandwidth greater than 160 MHz.

In a possible manner, whether RUs indicated in the RU allocation field are for the primary 160 MHz channel or the secondary 160 MHz channel is indicated by using B25. Optionally, an RU division manner in the current primary 160 MHz may be completely reused in the secondary 160 MHz channel. An RU whose size (size) is greater than 160 MHz may be indicated by using a reserved mode (reserved value) in the current 8-bit RU allocation.

In another possible manner, B25 is combined with 8 bits in the RU allocation into 9 bits, and all RUs in the bandwidth greater than 160 MHz are planned in a brand new manner.

It should be noted that, the point that indication of the RU allocation in the TRS expands for the bandwidth greater than 160 MHz may be applied to a case of hybrid transmission, for example, a scenario of HE and EHT hybrid transmission, but is not limited thereto. In a scenario of non-hybrid transmission, for example, when the EHT station performs transmission by using a channel whose bandwidth is greater than 160 MHz, the method can still be used for RU indication.

An embodiment of this application provides an RU indication method, which may be used for indicating RUs on a channel whose bandwidth is greater than 160 MHz. This method is not only applicable to the foregoing scenario of hybrid transmission, but also used for a scenario of non-hybrid transmission. An access point (AP) sends a frame to at least one second station. The frame includes a resource unit allocation field and a reserved bit. The resource unit allocation field and the reserved bit jointly indicate an RU used by the second station to send uplink data. The resource unit is located in a second bandwidth. The second station supports the second bandwidth, and the second bandwidth may be greater than 160 MHz.

For example, the AP may be the AP 105 in FIG. 1, and second STAs may be the STA 103 and the STA 104 in FIG. 1. The second STA supports the 802.11be standard, and may be referred to as an EHT STA.

In a possible implementation, the second bandwidth may be divided into resource units by using an 802.11ax standard. The second bandwidth includes primary 160 MHz and another bandwidth other than the primary 160 MHz. Division of the second bandwidth may include: Front 160 MHz is divided according to a rule of the 802.11ax standard, and the another bandwidth other than the primary 160 MHz may also be divided based on a specification of the 802.11ax standard.

In a possible implementation, the resource unit allocation field includes 8 bits, and the second reserved bit may include 1 bit. Whether RUs indicated in the RU allocation field are for the primary 160 MHz channel or the secondary 160 MHz channel is indicated by using B25. Optionally, an RU division manner in the current primary 160 MHz may be completely reused in the secondary 160 MHz channel. An RU whose size (size) is greater than 160 MHz may be indicated by using a reserved mode (reserved value) in the current 8 bit RU allocation.

In another possible implementation, B25 is combined with 8 bits in the RU allocation into 9 bits, and all RUs in the bandwidth greater than 160 MHz are planned and indicated in a brand new manner.

In an implementation, the frame is a trigger frame. This implementation specifically includes: The access point (AP) sends a trigger frame to at least one second station, where the trigger frame includes the resource unit allocation field and the second reserved bit, and the resource unit allocation field and the reserved bit are used for indicating a resource unit used by the at least one second station to send uplink data. The second station sends a TB PPDU, where the TB PPDU includes the uplink data carried on the resource unit. A bandwidth of the TB PPDU is the second bandwidth.

Optionally, the trigger frame further includes: an uplink bandwidth field and a first reserved bit. The uplink bandwidth field and the first reserved bit are used to jointly indicate the second bandwidth. A specific indication method includes but is not limited to: 1. An indication method compatible with the existing 802.11ax protocol. Refer to the description in method 1 in the foregoing embodiment. 2. Two bits of the uplink bandwidth field are combined with 1 bit of the first reserved bit into 3 bits, and a size of the second bandwidth is indicated in a brand new manner. Eight values of the 3 bits may correspond to eight sizes of the bandwidth, and there are a plurality of specific mapping relationships therebetween. This is not limited in this application.

The second station receiving the trigger frame determines, based on the uplink bandwidth field and the first reserved bit, the size of the second bandwidth in which the RU is located, jointly determines, based on the resource unit allocation field and the second reserved bit, the size and the location of the RU for sending the uplink data, and completes transmission of the uplink TB PPDU.

In another implementation, the frame is an A-MPDU frame, the A-MPDU frame includes a TRS field, and the TRS field includes the resource unit allocation field and the reserved bit, to indicate a resource unit carrying acknowledgement information in response to the A-MPDU frame. Refer to the description in the foregoing embodiment for a specific indication method. Details are not described herein again.

An embodiment of this application provides a method for indicating RA-RUs for OFDMA-based random access (UORA). This method is not only applicable to a scenario of hybrid transmission, but also applicable to a scenario of non-hybrid transmission.

An AP sends a trigger frame, where the trigger frame is used to trigger a STA to perform uplink OFDMA-based random access. The trigger frame includes a user information field, which includes an association identifier (association identifier, AID) field, a resource unit allocation (RU Allocation) field, and a random access resource unit information (random access resource unit information, RA-RU information) field, and a specific AID value may be used to indicate that a plurality of consecutive RUs starting from an RU indicated by the resource unit allocation field are random access resource units (random access resource units, RA-RUs) for a second station to perform random access, where the RA-RU information indicates a quantity of the plurality of consecutive RA-RUs. For example, the AP may be the AP 105 in FIG. 1, and the second STAs may be the STA 103 and the STA 104 in FIG. 1. The second STA supports the 802.11be standard, and may be referred to as an EHT STA.

When the value of the AID field is a second AID value (for example, 2044 or 2047), it indicates that a plurality of RA-RUs may be used for the second STA to perform random access. Optionally, the second station may include associated and unassociated second stations. For example, when the second AID value is 2044, it may indicate that the RA-RUs may be used for the associated second station, and when the second AID value is 2047, it indicates that the RA-RUs may be used for the unassociated second station. Certainly, the second AID value may alternatively be another special AID value to indicate that the RA-RUs are for the associated or unassociated second station.

After receiving the trigger frame, the second station determines, based on the second AID value in the AID field, that the second station is scheduled to perform UORA, and may further determine, based on the AID value, whether the associated second station or the unassociated second station is scheduled to perform UORA.

It should be noted that, the solutions of the foregoing embodiments may be combined with each other if logical.

Figure 10:
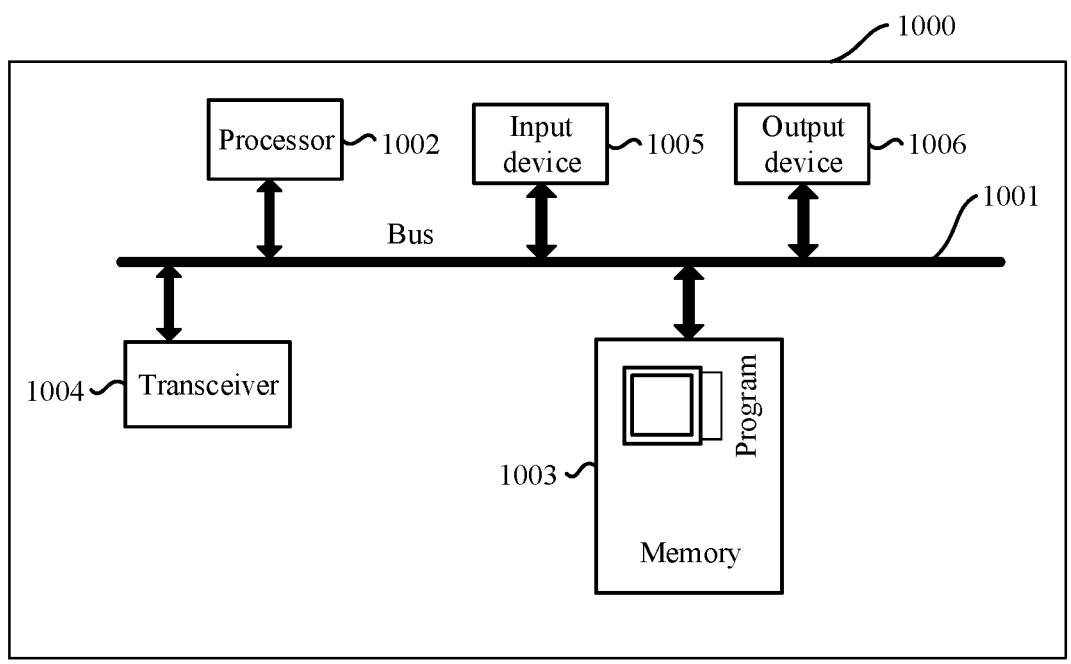
FIG. 10 is a schematic diagram of a structure of an apparatus according to an embodiment of this application.

FIG. 10 is a possible schematic diagram of a structure of an OFDMA hybrid transmission apparatus 1000 in the foregoing embodiments. The apparatus 1000 may include a processor 1002, a computer-readable storage medium/memory 1003, a transceiver 1004, an input device 1005, an output device 1006, and a bus 1001. The processor, the transceiver, the computer-readable storage medium, and the like are connected through the bus. A specific connection medium between the foregoing components is not limited in this embodiment of this application.

In a possible implementation, the apparatus 1000 may be configured as an AP 1 (for example, the AP 105) in the foregoing WLAN communications system 100, or as a chip system or a chip in the AP. The apparatus 1000 may perform the methods and steps related to the AP in any one of the foregoing embodiments.

For example, the transceiver 1004 may be configured to: support the AP in communicating with the one or more first STAs in the foregoing embodiments, and further support the AP in communicating with the one or more second STAs in the foregoing embodiments, and may perform receiving and sending processes of the AP in FIG. 3 to FIG. 9 and/or another process used for the technology described in this application.

For example, the transceiver 1004 may be configured to perform S401, S406, or S407. In another example, the transceiver 1004 may be configured to perform S801 or receive information in S804 and S805. Certainly, the transceiver 1004 may further be configured to perform another process and method of the technology described in this application.

The processor 1002 is configured to control and manage an action of the AP, is configured to perform processing performed by the AP in the foregoing embodiments, may perform processing processes of the AP in FIG. 3 to FIG. 9 and/or another process used for the technology described in this application, may be responsible for managing the bus, and may execute a program or instructions stored in the memory. For example, the processor 1002 may be configured to generate information sent in S401 or S407, and may be configured to parse information received in S406. In another example, the processor 1002 may be configured to generate information sent in S801, and may further parse information in S804 and S805. Certainly, the transceiver 1002 may further be configured to perform another process and method of the technology described in this application.

The computer-readable storage medium/memory 1003 stores a program, instructions, or data for performing the technical solutions of this application. For example, the computer-readable storage medium/memory 1003 may include instructions sufficient to allow the apparatus 1000 to perform the methods and functions in any one of the foregoing embodiments.

In another possible implementation, the apparatus 1000 may be configured as a second STA (for example, the STA 103 or the STA 104) in the foregoing WLAN communications system 100.

The transceiver 1004 may be configured to support the first STA in communicating with the foregoing AP, and may perform communication or interaction processes related to the first STA in FIG. 3 to FIG. 9 and/or another process used for the technology described in this application. For example, the transceiver 1004 may be configured to perform S403, S405, S407, or S409. In another example, the transceiver 1004 may be further configured to perform S803 and S805.

The processor 1002 is configured to control and manage an action of the second STA, and is configured to perform processing performed by the second STA in the foregoing embodiments, may perform processing processes related to the second STA in FIG. 3 to FIG. 9, may be responsible for managing a bus, and may execute programs or instructions stored in the memory. For example, the processor 1002 may be configured to parse information in S403, may generate data in S405, and may parse information in S409. In another example, the processor 1002 may be configured to parse a PPDU received in S803, and may be further configured to generate information in S805.

The computer-readable storage medium/memory 1003 stores a program, instructions, and data for performing the technical solutions of this application. For example, the computer-readable storage medium/memory 1003 may include instructions sufficient to allow the apparatus 1000 to perform the functions related to the second station in any one of the foregoing embodiments.

It may be understood that FIG. 10 merely shows a simplified design of the communications apparatus 1000. In actual application, the communications apparatus 1000 may include any quantity of transceivers, processors, memories, and the like. All communications apparatuses 1000 that can implement this application fall within the protection scope of the present application.

The processor in the apparatus 1000 may be a general-purpose processor such as a general-purpose central processing unit (CPU), a network processor (Network Processor, NP for short), or a microprocessor, or may be an application-specific integrated circuit (application-specific integrated circuit, ASIC for short), or one or more integrated circuits configured to control program execution in the solutions of this application. The processor may also be a digital signal processor (Digital Signal Processor, DSP for short), a field-programmable gate array (Field-Programmable Gate Array, FPGA for short) or another programmable logic device, a discrete gate or a transistor logic device, or a discrete hardware component. Alternatively, a controller/processor may be a combination of processors implementing a computing function, for example, a combination of one or more microprocessors, or a combination of the DSP and the microprocessor. The processor usually performs logical and arithmetic operations according to program instructions stored in the memory.

The computer-readable storage medium/memory 1003 may further store an operating system and another application program. Specifically, the program may include program code, and the program code includes computer operation instructions. More specifically, the memory may be a read-only memory (read-only memory, ROM for short), another type of static storage device that can store static information and instructions, a random access memory (random access memory, RAM for short), another type of dynamic storage device that can store information and instructions, or a magnetic disk storage, or the like. The memory 1803 may be a combination of the foregoing storage types. In addition, the computer-readable storage medium/memory may be located in the processor, or may be located outside the processor, or distributed in a plurality of entities including the processor or a processing circuit. The computer-readable storage medium/memory may be specifically embodied in a computer program product. For example, the computer program product may include a computer-readable medium in a packaging material.

Alternatively, the apparatus 1000 may be configured as a universal processing system. For example, the universal processing system is usually referred to as a chip. The general processing system includes one or more microprocessors that provide a processor function, and an external memory that provides at least a part of the storage medium. All these components are connected to other supporting circuits by using an external bus architecture.

Figure 11:
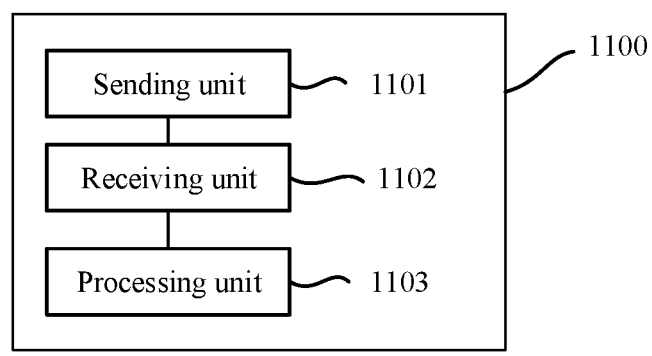
FIG. 11 is a schematic diagram of a structure of another apparatus according to an embodiment of this application.

FIG. 11 is a possible schematic diagram of a structure of an OFDMA hybrid transmission apparatus 1100 according to this application. The apparatus 1100 may include a sending unit 1101, a receiving unit 1102, and a processing unit 1103.

In a possible implementation, the apparatus 1100 may be configured as an AP 1 (for example, the AP 105) in the foregoing WLAN communications system 100, or as a chip system or a chip in the AP. The apparatus 1100 may perform the methods and steps related to the AP in any one of the foregoing embodiments.

For example, the sending unit 1101 and the receiving unit 1102 may be configured to support communication between the AP and one or more first STAs in the foregoing embodiments, further support communication between the AP and one or more second STAs in the foregoing embodiments, and may perform sending and receiving processes related to the AP in FIG. 3 to FIG. 9 and/or another process used for a technology described in this application.

In an example, the sending unit 1101 may be configured to send a trigger frame, and the receiving unit 1102 is configured to receive a TB PPDU. For structures of the trigger frame and the TB PPDU, refer to descriptions in the foregoing embodiments. For example, the sending unit may be configured to perform S401 or S407, and the receiving unit may perform S406.

In another example, the sending unit 1101 may be configured to send an MU PPDU, and the receiving unit 1102 may receive acknowledgement information. For a field included in the MU PPDU and a structure of the MU PPDU, refer to the descriptions in the foregoing embodiments. For example, the sending unit may be configured to perform S801, and the receiving unit may be configured to perform S804 and S805.

In another possible implementation, the apparatus 1000 may be configured as a second STA (for example, the STA 103 or the STA 104) in the foregoing WLAN communications system 100. For example, the sending unit 1101 and the receiving unit 1102 may be configured to support communication between the STA and the AP in the foregoing embodiments, and may perform sending and receiving processes related to the second STA in FIG. 3 to FIG. 9 and/or another process used for a technology described in this application.

In an example, the sending unit 1101 may be configured to send a TB PPDU, the receiving unit 1102 may be configured to receive a trigger frame, and the processing unit 1103 is configured to generate or process signaling or data information. For example, the sending unit 1101 may be configured to perform S405, and the receiving unit 1102 may be configured to perform S409.

In another example, the sending unit 1101 may be configured to send acknowledgement information, and the receiving unit 1102 may be configured to receive an MU PPDU. For example, the sending unit 1101 may be configured to perform S805, and the receiving unit 1102 may be configured to perform S803. The processing unit 1103 is configured to generate or process signaling or data information.

It should be noted that for fields or structures in the trigger frame, TB PPDU, and MU PPDU mentioned above, refer to descriptions in the foregoing embodiments. Details are not described herein again.

For example, the apparatus 1100 may be a chip or a chip system. The sending unit 1101 in the chip or the chip system may be an output interface, the receiving unit 1102 may be an input interface 1102, and the processing unit 1103 may be a processing circuit. In the foregoing embodiments, "send" may be "output", and "receive" may be "input". Therefore, the input/output interface completes signaling or data interaction, and the processing circuit completes signaling or data information generation and processing.

Optionally, the apparatus 1100 may be further coupled to a memory. The memory stores instructions. When the processing circuit runs the instructions, the apparatus 1100 is enabled to perform the method and the steps in any one of the foregoing embodiments. For example, the memory may be a storage unit included in the apparatus 1100, or may be an external storage unit outside the apparatus 1100.

An embodiment of this application further provides a chip system. The chip system includes a processor, configured to support an AP or a second STA in implementing the function in any of the foregoing embodiments, for example, generating or processing data and/or information in the foregoing methods. In a possible design, the chip system may further include a memory. The memory is configured to store program instructions and data that are necessary for a transmit end or a receive end. When the processor runs the program instructions, a device mounted in the chip system is enabled to perform the method in any one of the foregoing embodiments. The chip system may include a chip, or may include a chip and another discrete component.

An embodiment of this application further provides a processor, configured to be coupled to a memory. The memory stores instructions. When the processor runs the instructions, the processor is enabled to perform the method and function related to the AP or the STA in any one of the foregoing embodiments. An embodiment of this application further provides a computer program product including an instruction. When the computer program product is run on a computer, the computer is enabled to perform the method and the function that are related to the AP or the STA in any one of the foregoing embodiments. An embodiment of this application further provides a computer-readable storage medium. The computer-readable storage medium stores instructions. When a processor runs the instructions, the processor is enabled to perform the method and function related to the AP or the STA in any one of the foregoing embodiments. An embodiment of this application further provides an apparatus, configured to perform the method and the function that are related to the receive end or the transmit end in any one of the foregoing embodiments. An embodiment of this application further provides a wireless communications system. The system includes the AP, the at least one first STA, and the at least one second STA in any one of the foregoing embodiments.

Method or algorithm steps described in combination with the content disclosed in this application may be implemented by hardware, or may be implemented by a processor by executing software instructions. The software instructions may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in one or more of the foregoing examples, the functions described in this application may be implemented by using hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, the technical solutions, and the benefits of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions of this application shall fall within the protection scope of this application.

What is claimed is:

1. An orthogonal frequency division multiple access (OFDMA) uplink hybrid transmission method, comprising:
   sending, by an access point (AP), a trigger frame, wherein the trigger frame is used to trigger a first station (STA) supporting a first standard and a second STA supporting a second standard to perform OFDMA uplink transmission; and
   receiving, by the AP, a trigger-based physical layer protocol data unit (TB PPDU), wherein a bandwidth of the TB PPDU is a second bandwidth, and the TB PPDU comprises first uplink data sent by the first STA in response to the trigger frame and second uplink data sent by the second STA in response to the trigger frame, wherein the first STA supports a first bandwidth, the second STA supports the second bandwidth, and the second bandwidth is greater than the first bandwidth, and the trigger frame comprises a common information field, the common information field comprises an uplink bandwidth field and a first reserved bit, and the uplink bandwidth field and the first reserved bit are jointly used for determining, by the second STA, the second bandwidth, and the first bandwidth is determined, by the first STA based on the uplink bandwidth field.

2. The method according to claim 1, wherein the trigger frame is used to trigger the first STA to send the first uplink data on a first resource unit (RU), and is used to trigger the second STA to send the second uplink data on a second RU, wherein the first RU is located in the first bandwidth, and the second RU is located in the second bandwidth.

3. The method according to claim 1, wherein the trigger frame comprises a first user information field and a second user information field;

the first user information field comprises a first resource unit allocation field and a first association identifier (AID) field, the first AID field comprises an identifier of the first STA, and the first resource unit allocation field is used for indicating a first RU; and the second user information field comprises a second resource unit allocation field, a second AID field, and a second reserved bit, the second AID field comprises an identifier of the second STA, and the second resource unit allocation field and the second reserved bit are jointly used for indicating a second RU.

4. The method according to claim 3, wherein that the second resource unit allocation field and the second reserved bit are jointly used for indicating the second RU further comprises: the second reserved bit is used for indicating that the second RU is located on one of a primary 160 MHz channel or a secondary 160 MHz channel; and the second resource unit allocation field is used for indicating a size and a location of the second RU on the 160 MHz channel indicated by the second reserved bit.

5. The method according to claim 3, wherein when a value of the first AID field is a first AID value, a plurality of consecutive RUs starting from the first RU are indicated as one of available random access resource units RA-RUs of the first STA or available random access resource units RA-RUs of the first STA and the second STA; and when a value of the second AID field is a second AID value, a plurality of consecutive RUs starting from the second RU are indicated as available random access resource units of the second STA.

6. The method according to claim 1, wherein the trigger frame comprises a first trigger frame and a second trigger frame, wherein the first trigger frame is used to trigger the first STA to send the first uplink data on a first RU, and the second trigger frame is used to trigger the second STA to send the second uplink data on a second RU; and the first RU is comprised in the first bandwidth, and the second RU is comprised in the second bandwidth.

7. The method according to claim 6, wherein the first trigger frame is carried on a third RU of an MU PPDU, and the second trigger frame is carried on a fourth RU of the MU PPDU;

the MU PPDU comprises a signaling B field, wherein the signaling B field comprises: a fourth user information field corresponding to the fourth RU; and a value of a fourth AID field in the fourth user information field is a non-zero special AID value, used for indicating that the second trigger frame carried on the fourth RU is broadcast information.

8. The method according to claim 1, wherein the TB PPDU further comprises a first physical layer preamble sent by the first STA, and a second physical layer preamble sent by the second STA; and an OFDM symbol in the first physical layer preamble is aligned with an OFDM symbol in the second physical layer preamble, or the first physical layer preamble is the same as the second physical layer preamble.

9. The method according to claim 1, wherein the first bandwidth is 20 MHz, and the second bandwidth is any one of 40 MHz, 80 MHz, 160 MHz, 240 MHz, or 320 MHz; or the first bandwidth is 40 MHz, and the second bandwidth is any one of 80 MHz, 160 MHz, 240 MHz, or 320 MHz; or the first bandwidth is 80 MHz, and the second bandwidth is any one of 160 MHz, 240 MHz, or 320 MHz; or the first bandwidth is 160 MHz, and the second bandwidth is 240 MHz or 320 MHz.

10. The method according to claim 1, wherein the first standard is 802.11ax, and the second standard is 802.11be.

11. An orthogonal frequency division multiple access (OFDMA) uplink hybrid transmission method, comprising:

receiving, by a second station (STA) supporting a second standard, a trigger frame, wherein the trigger frame is used to trigger a first STA supporting a first standard and the second STA to perform OFDMA uplink transmission; and sending, by the second station, a trigger-based physical layer protocol data unit (TB PPDU) based on the trigger frame, wherein a bandwidth of the TB PPDU is a second bandwidth, and the TB PPDU comprises first uplink data sent by the first STA in response to the trigger frame and second uplink data sent by the second STA in response to the trigger frame, wherein the first STA supports a first bandwidth, the second STA supports the second bandwidth, and the second bandwidth is greater than the first bandwidth, and the trigger frame comprises a common information field, the common information field comprises an uplink bandwidth field and a first reserved bit, and the uplink bandwidth field and the first reserved bit are jointly used for determining, by the second STA, the second bandwidth, and the first bandwidth is determined, by the first STA based on the uplink bandwidth field.

12. The method according to claim 11, wherein the trigger frame is used to trigger the first STA to send the first uplink data on a first resource unit (RU), and is used to trigger the second STA to send the second uplink data on a second RU, wherein the first RU is located in the first bandwidth, and the second RU is located in the second bandwidth.

13. The method according to claim 11, wherein the trigger frame comprises a common information field, the common information field comprises an uplink bandwidth field and a first reserved bit, and the uplink bandwidth field and the first reserved bit are jointly used for determining, by the second STA, the second bandwidth.

14. The method according to claim 11, wherein the trigger frame comprises a first user information field and a second user information field;
- the first user information field comprises a first resource unit allocation field and a first association identifier (AID) field, the first AID field comprises an identifier of the first STA, and the first resource unit allocation field is used for indicating a first RU; and
- the second user information field comprises a second resource unit allocation field, a second AID field, and a second reserved bit, the second AID field comprises an identifier of the second STA, and the second resource unit allocation field and the second reserved bit are jointly used for indicating a second RU.

15. The method according to claim 14, wherein that the second resource unit allocation field and the second reserved bit are jointly used for indicating the second RU further comprises: the second reserved bit is used for indicating that the second RU is located on one of a primary 160 MHz channel or a secondary 160 MHz channel; and the second resource unit allocation field is used for indicating a size and a location of the second RU on the 160 MHz channel indicated by the second reserved bit.

16. The method according to claim 14, wherein
- when a value of the first AID field is a first AID value, a plurality of consecutive RUs starting from the first RU are indicated as one of available random access resource units RA-RUs of the first STA or available random access resource units RA-RUs of the first STA and the second STA; and
- when a value of the second AID field is a second AID value, a plurality of consecutive RUs starting from the second RU are indicated as available random access resource units of the second STA.

17. The method according to claim 11, wherein the trigger frame comprises a first trigger frame and a second trigger frame, wherein
- the first trigger frame is used to trigger the first STA to send the first uplink data on a first RU, and the second trigger frame is used to trigger the second STA to send the second uplink data on a second RU; and
- the first RU is comprised in the first bandwidth, and the second RU is comprised in the second bandwidth.

18. The method according to claim 17, wherein the first trigger frame is carried on a third RU of an MU PPDU, and the second trigger frame is carried on a fourth RU of the MU PPDU;
- the MU PPDU comprises a signaling B field, wherein the signaling B field comprises: a fourth user information field corresponding to the fourth RU; and
- a value of a fourth AID field in the fourth user information field is a non-zero special AID value, used for indicating that the second trigger frame carried on the fourth RU is broadcast information.

19. An access point (AP), comprising
a processor; and
a non-transitory computer readable memory storing instructions, that when executed by the processor, cause the AP to perform steps comprising:
sending, a trigger frame, wherein the trigger frame is used to trigger a first station (STA) supporting a first standard and a second STA supporting a second standard to perform OFDMA uplink transmission; and
receiving a trigger-based physical layer protocol data unit (TB PPDU), wherein a bandwidth of the TB PPDU is a second bandwidth, and the TB PPDU comprises first uplink data sent by the first STA in response to the trigger frame and second uplink data sent by the second STA in response to the trigger frame, wherein
the first STA supports a first bandwidth, the second STA supports the second bandwidth, and the second bandwidth is greater than the first bandwidth, and
the trigger frame comprises a common information field, the common information field comprises an uplink bandwidth field and a first reserved bit, and the uplink bandwidth field and the first reserved bit are jointly used for determining, by the second STA, the second bandwidth, and the first bandwidth is determined, by the first STA based on the uplink bandwidth field.

* * * * *